United States Patent
Jain et al.

(10) Patent No.: US 10,643,179 B1
(45) Date of Patent: May 5, 2020

(54) METHOD AND SYSTEM FOR FULFILLING INVENTORY ITEMS

(71) Applicant: GREY ORANGE PTE. LTD., Singapore (SG)

(72) Inventors: Mayank Jain, Gurgaon (IN); Kumar Devvrat, Gurgaon (IN)

(73) Assignee: GREY ORANGE PTE. LTD., Singapore (SG)

(*) Notice: Subject to any disclaimer, the term of this patent is extended or adjusted under 35 U.S.C. 154(b) by 0 days.

(21) Appl. No.: 16/161,993

(22) Filed: Oct. 16, 2018

(51) Int. Cl.
  *G06Q 30/00* (2012.01)
  *G06Q 10/08* (2012.01)
  *B65G 1/137* (2006.01)

(52) U.S. Cl.
  CPC ......... *G06Q 10/087* (2013.01); *B65G 1/1378* (2013.01)

(58) Field of Classification Search
  CPC ........ F25B 49/00; G06Q 10/08; G06Q 30/00; G06Q 10/043; G06F 7/00
  USPC ............................................. 705/28; 700/214
  See application file for complete search history.

(56) References Cited

U.S. PATENT DOCUMENTS

| | | | | |
|---|---|---|---|---|
| 7,010,389 B2 * | 3/2006 | Lunak | ...................... | B65G 1/12 700/243 |
| 7,751,928 B1 * | 7/2010 | Antony | ................ | G06Q 10/087 700/214 |
| 7,774,243 B1 * | 8/2010 | Antony | .............. | G06Q 10/0875 414/243 |
| 8,594,834 B1 * | 11/2013 | Clark | ................... | G06Q 10/087 700/214 |
| 8,718,814 B1 * | 5/2014 | Clark | ..................... | G06Q 10/08 700/214 |
| 8,892,240 B1 * | 11/2014 | Vliet | ....................... | B65B 59/00 700/213 |
| 9,020,631 B1 * | 4/2015 | Bellavance | ............ | G06Q 50/28 700/213 |
| 9,111,251 B1 * | 8/2015 | Brazeau | ............... | G06Q 10/087 |
| 9,466,045 B1 | 10/2016 | Kumar | | |
| 9,488,979 B1 * | 11/2016 | Chambers | ............ | G05D 1/0088 |
| 9,663,292 B1 * | 5/2017 | Brazeau | ................. | G06Q 10/04 |
| 9,969,486 B1 * | 5/2018 | O'Brien | ................ | B64C 39/024 |
| 10,026,044 B1 * | 7/2018 | Wurman | .............. | G06Q 10/047 |
| 2003/0171962 A1 * | 9/2003 | Hirth | ................ | G06Q 10/06315 705/7.25 |

(Continued)

OTHER PUBLICATIONS

International Search Report dated Dec. 10, 2019 in PCT/IB2019/058834.

*Primary Examiner* — Oluseye Iwarere
(74) *Attorney, Agent, or Firm* — Oblon, McClelland, Maier & Neustadt, L.L.P.

(57) ABSTRACT

A system and method for fulfilling a plurality of inventory items in a first facility is provided. A server receives a first request to fulfill the plurality of inventory items and retrieves layout information of the first facility. Based on the layout information, the server identifies a plurality of nodes in the first facility, at which the plurality of inventory items is to be fulfilled. The server identifies a first route to first and second nodes of the plurality of nodes at which first and second inventory items of the plurality of inventory items are to be fulfilled, respectively. The server then allocates the first and second inventory items to a first transport unit for transferring the first and second inventory items to the first facility.

29 Claims, 15 Drawing Sheets

(56) References Cited

U.S. PATENT DOCUMENTS

| | | | |
|---|---|---|---|
| 2003/0172007 A1* | 9/2003 | Helmolt | G06Q 10/06316 705/28 |
| 2004/0010337 A1* | 1/2004 | Mountz | G05D 1/0274 700/214 |
| 2004/0010339 A1* | 1/2004 | Mountz | G05D 1/0274 700/216 |
| 2013/0103185 A1* | 4/2013 | Wurman | B65G 1/1378 700/216 |
| 2014/0100769 A1 | 4/2014 | Wurman et al. | |
| 2015/0242944 A1* | 8/2015 | Willard | G06Q 30/0645 705/5 |
| 2017/0011449 A1* | 1/2017 | Mueller | G06Q 30/0635 |
| 2017/0124511 A1* | 5/2017 | Mueller | G06Q 10/0837 |
| 2018/0058739 A1* | 3/2018 | Zou | F25B 49/00 |
| 2018/0285808 A1 | 10/2018 | Swiercz et al. | |
| 2019/0034877 A1* | 1/2019 | Cantrell | G06Q 10/08355 |

* cited by examiner

400

| Intermediate Route | Stops of intermediate route | Volumetric Requirement |
|---|---|---|
| $IR_{10}$ | $O \rightarrow N_{10} \rightarrow O$ | $200 \times V_1$ |
| $IR_{15}$ | $O \rightarrow N_{15} \rightarrow O$ | $300 \times V_2$ |
| $IR_{20}$ | $O \rightarrow N_{20} \rightarrow O$ | $200 \times V_3$ |
| $IR_{25}$ | $O \rightarrow N_{25} \rightarrow O$ | $150 \times V_4$ |
| $IR_{32}$ | $O \rightarrow N_{32} \rightarrow O$ | $250 \times V_5$ |

| Distance saving factor (descending order) | Pair of fulfillment nodes |
|---|---|
| $S_{20,25}$ | $N_{20}$ and $N_{25}$ |
| $S_{10,25}$ | $N_{10}$ and $N_{25}$ |
| $S_{20,32}$ | $N_{20}$ and $N_{32}$ |
| $S_{25,32}$ | $N_{25}$ and $N_{32}$ |
| $S_{10,15}$ | $N_{10}$ and $N_{15}$ |
| $S_{10,20}$ | $N_{10}$ and $N_{20}$ |
| $S_{15,32}$ | $N_{15}$ and $N_{32}$ |
| $S_{10,32}$ | $N_{10}$ and $N_{32}$ |
| $S_{15,20}$ | $N_{15}$ and $N_{20}$ |
| $S_{15,25}$ | $N_{15}$ and $N_{25}$ |

FIG. 5

METHOD AND SYSTEM FOR FULFILLING INVENTORY ITEMS

FIELD

The present disclosure relates generally to inventory management in retail establishments, and, more particularly to a method and a system for fulfilling inventory items in retail establishments.

BACKGROUND

A retail facility, such as a grocery store, an apparel store, or a departmental store, typically displays inventory items on various shelves of display racks in the retail facility. To improve the shopping experience of customers visiting the retail facility, the retail facility is segregated into various departments based on categories of the inventory items. For example, the apparel store is segregated into three departments, such as women's clothing, men's clothing, and kids' clothing departments. The display racks within each department are arranged in aisles and the inventory items are organized in groups and subgroups within the shelves of the display racks. For example, the men's clothing department may include a shirts aisle and a trousers aisle, among others. The shirts and trousers aisles include various groups of shirts and trousers, respectively, based on size and material. As the customers purchase the inventory items from the retail facility, the stock of the inventory items depletes. Further, the retail facility may launch a new inventory item for sale. In such scenarios, the retail facility places a fulfillment order from a distribution warehouse to replenish the depleted stock of inventory items and obtain stock for the new inventory item.

Generally, the distribution warehouse stores the inventory items in bulk quantities to cater to fulfillment orders received from multiple retail facilities. The inventory items in the distribution warehouse are also organized in groups and stored in racks. When the distribution warehouse receives a fulfillment order from the retail facility, a number of units of each inventory item specified in the fulfillment order is retrieved from a corresponding rack and packed in containers or trolleys for shipment.

When the shipment is received by the retail facility, operators of the retail facility fulfill the inventory items at the corresponding shelves in the display racks. Fulfilling the inventory items typically includes unpacking and sorting the inventory items. For example, when the shirts aisle in the men clothing department is after the trousers aisle, shirts need to be picked and sorted prior to trousers for fulfillment. The unpacking and sorting of the inventory items is a time-consuming process. In addition, a path followed by an operator of the retail facility to fulfill the inventory items is chosen by the operator and hence may not be an optimum choice. Further, the capacity of a trolley used by the operator to fulfill the inventory items may not be utilized properly. For example, the operator may load the trolley with shirts having medium size only, when the trolley has enough space to accommodate shirts having small size and the shelf allotted to small sized shirts is next to the shelf of the shirts having medium size. In certain scenarios, the fulfillment activities, such as unpacking and sorting, may interfere with customer activities, thereby leading to an unpleasant shopping experience for the customers.

In light of the foregoing, there exists a need for a solution that reduces fulfillment time and efforts by packing inventory items in containers or trolleys according to an optimal fulfillment sequence in the retail facility and capacities of the containers or trolleys.

SUMMARY

In an embodiment of the present disclosure, a method for fulfilling a plurality of inventory items in a first facility is provided. The method includes receiving, by an inventory management server, a first request to fulfill the plurality of inventory items in the first facility. The plurality of inventory items is stored in a second facility before fulfillment. Layout information of the first facility is retrieved from a database by the inventory management server. A plurality of nodes is identified in the first facility, at which the plurality of inventory items is to be fulfilled, based on the layout information by the inventory management server. A first route to first and second nodes of the plurality of nodes, at which first and second inventory items of the plurality of inventory items are to be fulfilled, respectively, is identified by the inventory management server. The first and second inventory items are allocated by the inventory management server to a first transport unit available at the second facility. The first and second inventory items are transferred from the second facility to the first facility via the first transport unit and fulfilled at the first and second nodes, respectively, when the first transport unit traverses along the first route.

In another embodiment of the present disclosure, a system for fulfilling a plurality of inventory items in a first facility is provided. The system includes a database and an inventory management server. The database is configured to store layout information of the first facility. The inventory management server is configured to communicate with the database and includes processing circuitry. The processing circuitry is configured to receive a first request to fulfill the plurality of inventory items in the first facility. The plurality of inventory items is stored in a second facility before fulfillment. The processing circuitry is configured to retrieve the layout information of the first facility from the database. The processing circuitry is further configured to identify a plurality of nodes in the first facility, at which the plurality of inventory items is to be fulfilled, based on the layout information. The processing circuitry is further configured to identify a first route to first and second nodes of the plurality of nodes at which first and second inventory items of the plurality of inventory items are to be fulfilled, respectively. The processing circuitry is further configured to allocate the first and second inventory items to a first transport unit available at the second facility. The first and second inventory items are transferred from the second facility to the first facility by way of the first transport unit and fulfilled at the first and second nodes, respectively, when the first transport unit traverses along the first route.

BRIEF DESCRIPTION OF THE DRAWINGS

The accompanying drawings illustrate various embodiments of systems, methods, and other aspects of the present disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements:

FIG. 4 is a table that illustrates intermediate routes identified by the inventory management server, in accordance with an embodiment of the present disclosure;

FIG. 5 is a table that illustrates distance saving factors determined by the inventory management server, in accordance with an embodiment of the present disclosure;

Figure 1:
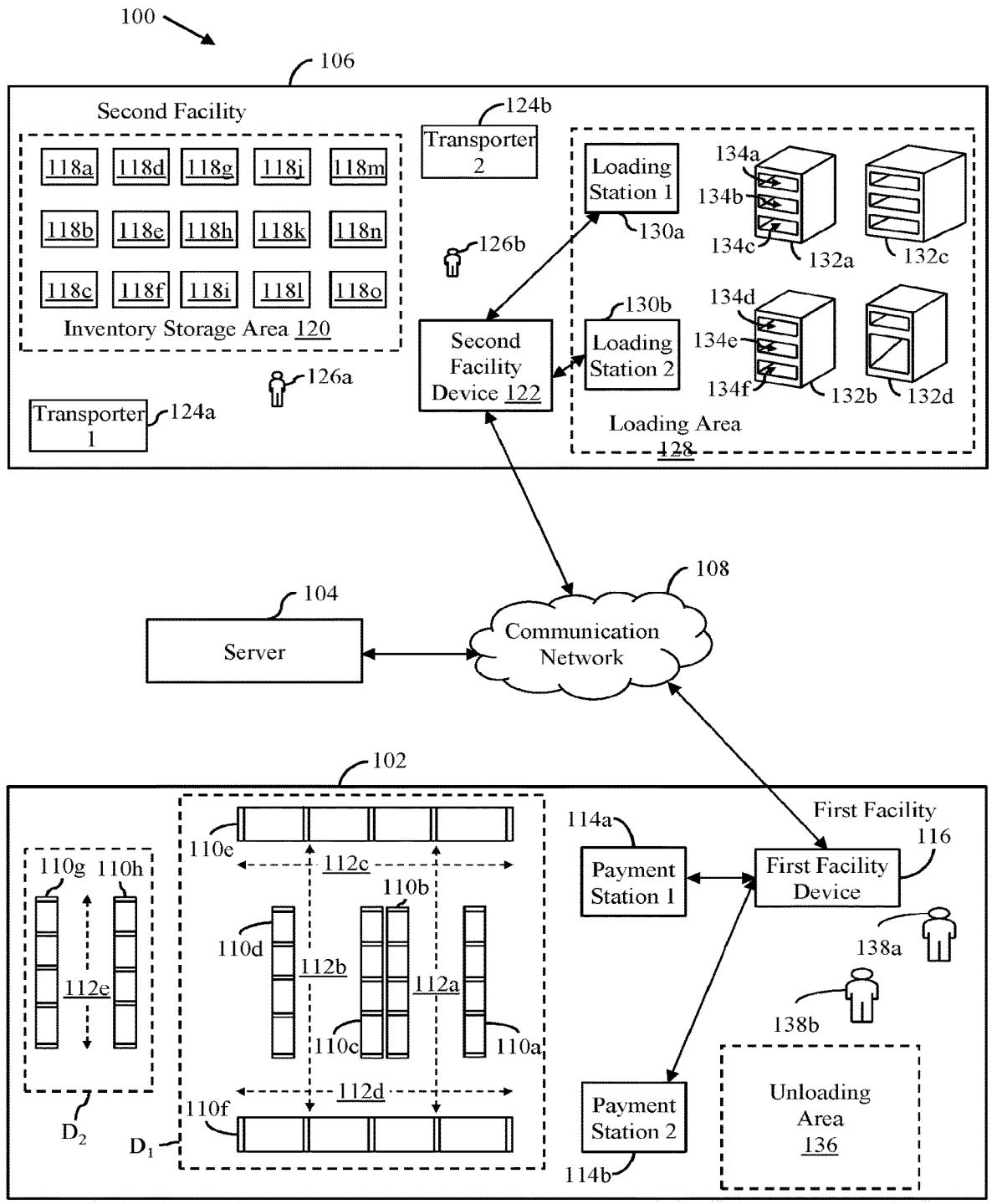
FIG. 1 is a block diagram that illustrates an exemplary environment, in accordance with an embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Various embodiments of the present disclosure provide a method and a system for fulfilling inventory items in a first facility. An inventory management server receives a first request from the first facility that is indicative of the inventory items that are to be fulfilled in the first facility and a number of units of each inventory item. Before fulfillment, the inventory items are stored in a second facility. After receiving the first request, the inventory management server retrieves layout information of the first facility and transport unit data of transport units available in the second facility. In one embodiment, the layout information includes details pertaining to location data of various departments in the first facility, location data of aisles within each department of the first facility, location data of nodes in the first facility, an association between the aisles and the nodes, and an association between the nodes and inventory items sold in the first facility, respectively. Each node in the first facility is associated with a specific inventory item. The transport unit data includes details, such as capacity, dimensions, and a number of bins, of the transport units. Based on the layout information, the inventory management server identifies fulfillment nodes in the first facility that are to be fulfilled with the inventory items, respectively. After identifying the fulfillment nodes, the inventory management server identifies optimal routes that cater to the fulfillment nodes. For example, a first optimal route may cater to at least first and second fulfillment nodes in a first department for fulfilling first and second inventory items at the first and second fulfillment nodes, respectively, and a second optimal route may cater to at least third and fourth fulfillment nodes in a second department for fulfilling third and fourth inventory items at the third and fourth fulfillment nodes, respectively. The inventory management server identifies the optimal routes based on multiple parameters, such as the capacities of the transport units, volumetric requirement of each fulfillment node, and a distance between each pair of the fulfillment nodes.

Upon identification of the optimal routes, the inventory management server allocates one transport unit to inventory items associated with each optimal route based on the capacity of the transport unit and the volumetric requirement of the corresponding optimal route. For example, a first transport unit is allocated for loading the first and second inventory items associated with the first optimal route when the capacity of the first transport unit is greater than or equal to the volumetric requirement of the first optimal route. Likewise, a second transport unit is allocated for loading the third and fourth inventory items associated with the second optimal route. After the allocation of the transport units, the inventory management server maps the inventory items of each optimal route to bins of the corresponding transport unit. For example, the first and second inventory items are mapped to first and second bins, respectively, of the first transport unit, and the third and fourth inventory items are mapped to third and fourth bins, respectively, of the second transport unit. The mapping of the bins is based on at least one of centers of gravity of the first and second transport units, dimensions of the first and second transport units, capacities of the first through fourth bins, characteristics of the first through fourth inventory items, weights of the first through fourth inventory items, and a sequence of the fulfillment nodes in each optimal route. The inventory management server further initiates loading of the inventory items in the corresponding mapped bins of the allocated transport units in the second facility. The inventory items specified in the first request are transferred from the second facility to the first facility by way of the corresponding transport units. The inventory management server communicates navigation details of the optimal routes on operator devices of operators of the first facility. The operators use the navigation details to traverse along the optimal routes with the corresponding loaded transport units for fulfilling the inventory items in the corresponding fulfillment nodes. For example, a first operator uses the navigation details of the first optimal route to traverse along the first optimal route with the first transport unit to fulfill the first and second fulfillment nodes with the first and second inventory items, respectively. Likewise, a second operator uses the navigation details of the second optimal route to traverse along the second optimal route with the second transport unit to fulfill the third and fourth fulfillment nodes with the third and fourth inventory items, respectively.

Terms Description (in Addition to Plain and Dictionary Meaning)

"First facility" refers to, for example, a retail facility establishment, where multiple inventory items are sold. Examples of the first facility includes, but are not limited to, a grocery store, a medical store, a departmental store, and an apparel store. In one embodiment, the first facility is a forward warehouse.

"Second facility" refers to, for example, a distribution warehouse that stores multiple inventory items in bulk quantities to fulfill orders received from multiple retail facilities. In one embodiment, the second facility may be a distribution warehouse that caters to the orders of a single retail facility. In another embodiment, the second facility may be a backward warehouse that caters to the fulfillment in the forward warehouse.

"Inventory items" are, for example, objects that are sold in a retail facility. The inventory items are suitable for storage and retrieval and are usually organized in groups and subgroups based on their categories. For example, shampoos, moisturizers, and soaps are organized in a "cosmetic items" department, and fresh produce, canned food items, baked goods are organized in a "food" department.

"Aisles" are, for example, passageways between display racks of a retail facility along which customers, who visit the retail facility for shopping, move to select inventory items displayed on the display racks. Generally, the aisles are formed by arranging the display racks. For example, a first aisle is formed between display faces of first and second display racks. Thus, the inventory items that are displayed in the first and second display racks are accessible from the first aisle.

"Nodes" refer to, for example, shelves in display racks within a retail facility where inventory items are displayed for sale. Each node stores multiple units of a specific inventory item. For example, a first node may store 100 moisturizers and a second node may store 75 shampoos.

"Transport units" refer to, for example, containers having multiple bins into or onto which inventory items can be loaded and unloaded for the purpose of storage and shipping. Examples of transport units include, but are not limited to, boxes, pallets, totes, trolleys, and cartons. Different transport units have different capacities.

"Routes" refer to, for example, paths that are traversed along aisles of a retail facility by transport units for fulfilling inventory items at corresponding nodes in the retail facility. In one embodiment, a route may cater to multiple nodes within a department of the retail facility. In another embodiment, a route may cater to a single node. Each route is associated with a single department.

FIG. 1 is a block diagram that illustrates an exemplary environment 100, in accordance with an embodiment of the present disclosure. The environment 100 shows a first facility 102, a server 104, and a second facility 106. The server 104 communicates with various devices of the first and second facilities 102 and 106 by way of a communication network 108 or through separate communication networks established therebetween.

The first facility 102 is a retail facility where multiple inventory items are sold. Examples of the first facility 102 include, but are not limited to, a grocery store, an apparel store, and a departmental store. The inventory items that are sold in the first facility 102 are organized in various departments, such as first and second departments '$D_1$' and '$D_2$', based on their categories. For example, the first department $D_1$ is a food department $D_1$ and the second department $D_2$ is an apparels department $D_2$. Further, the food and apparels departments $D_1$ and $D_2$ have corresponding entry/exit points. In one embodiment, the entry/exit points may be static. In another embodiment, the entry/exit points may be dynamic. The inventory items within the food department $D_1$ are displayed on various nodes (e.g., shelves) of first through sixth display racks 110a-110f and the inventory items within the apparels department $D_2$ are displayed on various nodes of seventh and eighth display racks 110g-110h (hereinafter the first through eighth display racks 110a-110h are collectively referred to as "display racks 110"). In an example, the display racks 110 have first through sixty-fourth nodes $N_1$-$N_{64}$, such that each display rack 110 has eight nodes for displaying the inventory items. For example, the first through eighth display racks 110a-110h have shelves or nodes '$N_1$-$N_8$', '$N_9$-$N_{16}$', '$N_{17}$-$N_{24}$', '$N_{25}$-$N_{32}$', '$N_{33}$-$N_{40}$', '$N_{41}$-$N_{48}$', and '$N_{57}$-$N_{64}$', respectively. Hereinafter the first through sixty-fourth nodes $N_1$-$N_{64}$ are collectively referred to as "nodes N". Each node N stores units of a specific inventory item. For example, the first and second nodes $N_1$ and $N_2$ in the first display rack 110a may store apples and mangoes, respectively.

The display racks 110 are arranged such that first through fifth aisles 112a-112e (hereinafter referred to as "aisles 112") are formed therebetween. The first aisle 112a is formed between the display faces of the first and second display racks 110a and 110b, the second aisle 112b is formed between the display faces of the third and fourth display racks 110c and 110d. Likewise, the third aisle 112c is formed between the display face of the fifth display rack 110e and the side faces of the first through fourth display racks 110a-110d, and the fourth aisle 112d is formed between the display face of the sixth display rack 110f and the other side faces of the first through fourth display racks 110a-110d. The fifth aisle 112e is formed between the display faces of the seventh and eighth display racks 110g and 110h (as shown in FIG. 1). The first through fourth aisles 112a-112d are within the food department D₁ and the fifth aisle 112*e* is within the apparels department D₂.

Figure 2:
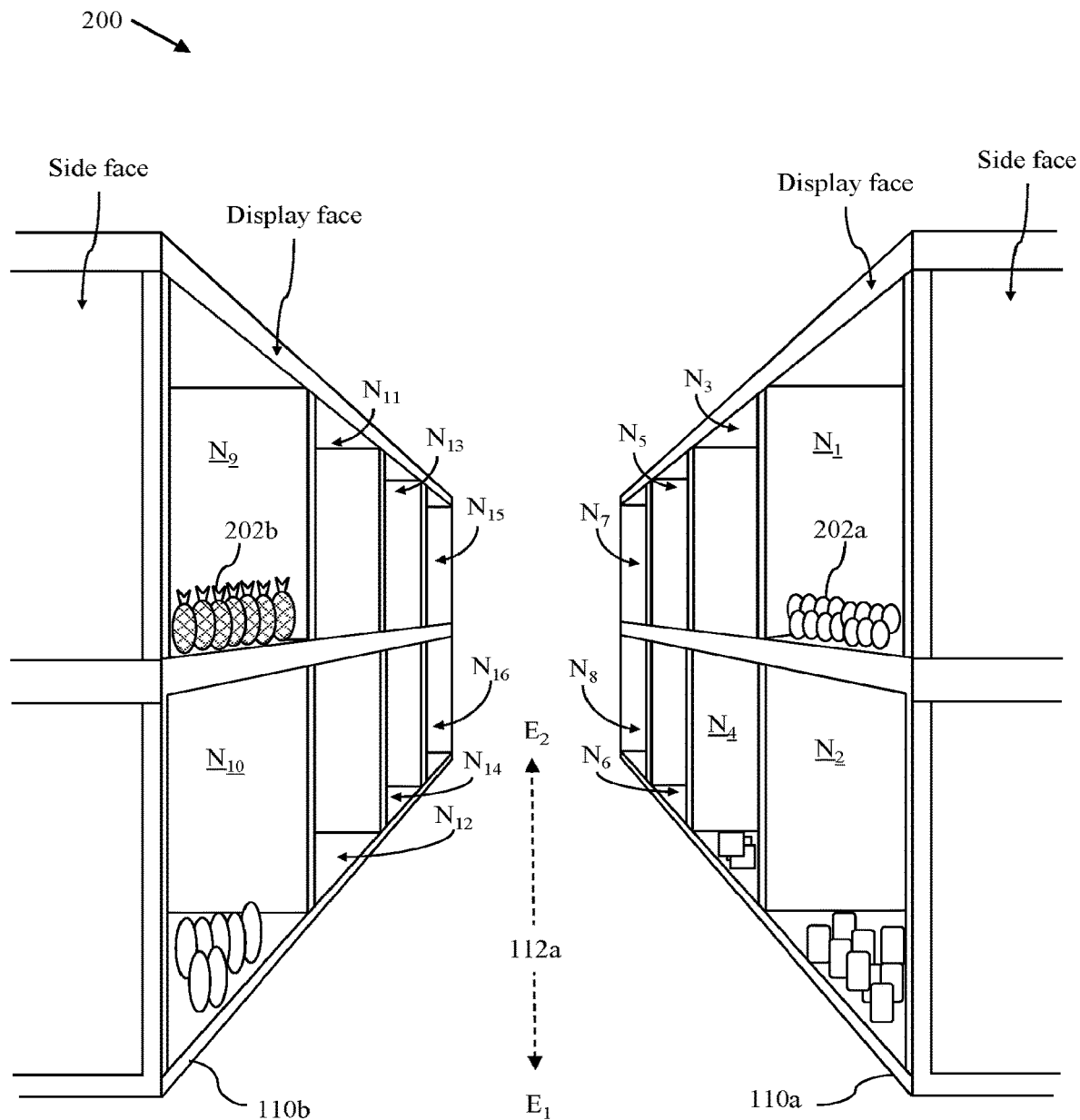
FIG. 2 is a block diagram of an exemplary scenario that illustrates an aisle within a first facility of FIG. 1, in accordance with an embodiment of the present disclosure.

The aisles 112 are passageways such that customers, who visit the first facility 102 for shopping, move along the aisles 112 to select inventory items from the corresponding display racks 110 for purchasing. Arrangement of the display racks 110 to form the aisles 112 is a standard practice and should be known to those of skill in the art. In a non-limiting example, it is assumed that the display racks 110 are arranged such that a layout of the aisles 112 forms a virtual grid in a rectangular space having the center of the first facility 102 as origin. Thus, each aisle 112 is one of a horizontal aisle or a vertical aisle. For example, the first aisle 112*a* is a vertical aisle and the fourth aisle 112*d* is a horizontal aisle. An intersection between horizontal and vertical aisles forms a cross-aisle. Each aisle 112 is associated with a specific group of inventory items in the corresponding department. For example, the first aisle 112*a* is associated with fresh fruits, the second aisle 112*b* is associated with fresh vegetables, the third aisle 112*c* is associated with canned food and the fourth aisle 112*d* is associated with baked food. Thus, the first and second display racks 110*a* and 110*b* that form the first aisle 112*a* store fresh fruits and the third and fourth display racks 110*c* and 110*d* that form the second aisle 112*b* store fresh vegetables. Likewise, the fifth display rack 110*e* that forms the third aisle 112*c* stores canned food items and the sixth display rack 110*f* that forms the fourth aisle 112*d* stores baked food items. Further, each aisle 112 has corresponding entry/exit points (as shown in FIG. 2). For example, the side of the first aisle 112*a* from where a customer may typically enter becomes the entry point and the side from where the customer leaves the first aisle 112*a* becomes the exit point. In one embodiment, only one-way movement is permitted across the aisles 112. In such a scenario, the aisles 112 have fixed entry and exit points which are not interchangeable. The entry/exit points of the aisles 112 are represented as x and y co-ordinates. Likewise, the nodes N have their corresponding location co-ordinates (i.e., x and y co-ordinates).

The first facility 102 further includes first and second payment stations 114*a* and 114*b* where the customers pay for purchasing the corresponding inventory items. The first and second payment stations 114*a* and 114*b* are equipped with billing devices that process purchase orders of the customers. The billing devices have price and offer details of all the inventory items in the first facility 102.

The first facility 102 further includes a first facility device 116 (i.e., a local server of the first facility 102) that maintains a record of the inventory items that are for sale in the first facility 102. For example, the first facility device 116 keeps a track of the inventory items purchased by the customers and a number of units of each inventory item available in the first facility 102. The first facility device 116 receives the processed purchase orders from the billing devices and updates the record of the inventory items accordingly. For example, the first facility 102 may initially have 100 units of mangoes and when a customer purchases five units of mangoes, the first facility device 116 decrements the number of available units of the mangoes from 100 to 95. The first facility device 116 further communicates a first request for fulfilling inventory items. The inventory items include items for which the number of available units in the first facility 102 has fallen below a threshold value and new items that are recently added to an inventory list of the first facility 102. In one example, when the number of the available units of mangoes and apples fall below 50 (i.e., the threshold value), the first facility device 116 communicates the first request to the server 104 by way of the communication network 108 for fulfilling mangoes and apples. The first request may further request a fulfillment of jack fruit which is recently added to the inventory list of the first facility 102. The first request is indicative of a number of units of each inventory item that is to be fulfilled. For example, the first request includes 500 units of mangoes, 300 units of apples, and 250 units of jack fruits. Examples of the first facility device 116 include, but are not limited to, laptops, tablets, computers, phablets, or any other communication devices.

In one embodiment, the first facility 102 may not have a separate first facility device 116. In such a scenario, the billing devices perform the operations of the first facility device 116 without deviating from the scope of the disclosure.

The server 104 is a network of computers, a software framework, or a combination thereof, that may provide a generalized approach to create the server implementation. Examples of the server 104 include, but are not limited to, personal computers, laptops, mini-computers, mainframe computers, any non-transient and tangible machine that can execute a machine-readable code, cloud-based servers, distributed server networks, or a network of computer systems. The server 104 may be realized through various web-based technologies such as, but not limited to, a Java web-framework, a .NET framework, a personal home page (PHP) framework, or any other web-application framework. The server 104 may be maintained by a warehouse management authority or a third-party entity that facilitates inventory management operations for the second facility 106. It will be understood by a person having ordinary skill in the art that the server 104 may perform other warehouse management operations as well along with the inventory management operations. Hereinafter, the server 104 is referred to as "inventory management server 104". Various components of the inventory management server 104 and their functionalities are described later in conjunction with FIG. 9.

The inventory management server 104 handles fulfillment of inventory items in multiple retail facilities, such as the first facility 102. The inventory management server 104 receives and processes first requests of the retail facilities, such as the first facility 102. For the sake of simplicity, the operations of the inventory management server 104 are explained with respect to a single retail facility, such as the first facility 102. The inventory management server 104 uses layout information of the first facility 102 to identify optimal routes that need to be traversed in the first facility 102 for fulfilling the inventory items at the corresponding nodes N. Based on the optimal routes, the inventory management server 104 determines packing instructions to pack the inventory items specified in the first request. The operations performed by the inventory management server 104 for identifying the optimal routes and determining the packing instructions are explained later in conjunction with FIG. 3.

The second facility 106 is a distribution warehouse where various inventory items are stored in bulk quantities to fulfill first requests of multiple retail facilities, such as the first facility 102. The inventory items in the second facility 106 are organized in groups and subgroups, and stored in first through fifteenth storage racks 118*a*-118*o* (hereinafter referred to as "storage racks 118") placed in an inventory storage area 120 of the second facility 106. The storage racks 118 are capable of being carried, rolled, otherwise moved. Storing inventory items in distribution warehouses is a standard practice and should be known to those of skill in the art.

The second facility 106 includes a second facility device 122 (i.e., a local server of the second facility 106) that receives the first request and packing instructions from the inventory management server 104 by way of the communication network 108. Examples of the second facility device 122 include, but are not limited to, laptops, tablets, computers, phablets, or any other communication devices. In one embodiment, the second facility device 122 instructs first and second transporters 124a and 124b to retrieve the storage racks 118 corresponding to the inventory items specified in the first request from the inventory storage area 120. The second facility device 122 may provide location co-ordinates and rack identifiers of the storage racks 118 that are to be retrieved to the first and second transporters 124a and 124b. The first and second transporters 124a and 124b are robotic vehicles that move in the second facility 106 and are used to retrieve the storage racks 118 corresponding to the first request (i.e., goods to person approach). The first and second transporters 124a and 124b communicate with the second facility device 122 by means of a wireless communication protocol, such as Wi-Fi, Bluetooth, Infrared, and the like. In another embodiment, the second facility device 122 instructs first and second agents 126a and 126b to retrieve the storage racks 118 corresponding to the first request from the inventory storage area 120. In yet another embodiment, the second facility device 122 instructs the first and second agents 126a and 126b to retrieve the inventory items specified in the first request from the inventory storage area 120 instead of the storage racks 118. The first and second agents 126a and 126b are individuals working in the second facility 106. The first and second transporters 124a and 124b or the first and second agents 126a and 126b move the storage racks 118 or the inventory items to a loading area 128 of the second facility 106.

The loading area 128 includes first and second loading stations 130a and 130b where the inventory items are loaded and packed in bins of first through fourth transport units 132a-132d (hereinafter the first through fourth transport units 132a-132d are collectively referred to as "transport units 132") available at the second facility 106 based on the packing instructions from the inventory management server 104. As shown in FIG. 1, the first transport unit 132a may include first through third bins 134a-134c and the second transport unit 132b includes fourth through sixth bins 134d-134f, for storing the loaded inventory items. Hereinafter, the first through sixth bins 134a-134f are collectively referred to as "bins 134". The bins 134 may have different capacities and dimensions. Upon completion of the packing, the loaded transport units 132 are shipped to the first facility 102. The process of loading the bins 134 is described later in conjunction with FIG. 6A.

Figure 10:
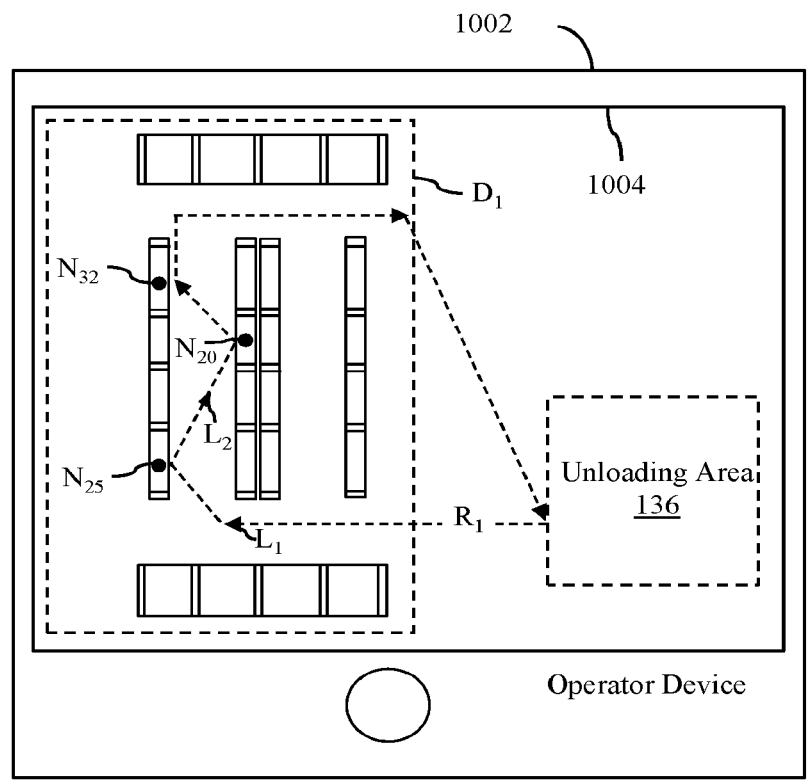
FIG. 10 is a block diagram that illustrates an operator device of an operator of the first facility, in accordance with an embodiment of the present disclosure.

The first facility 102 includes an unloading area 136 where the shipment is unloaded by first and second operators 138a and 138b. The unloading area 136 has sufficient space to accommodate multiple shipments at a given time instance. The first and second operators 138a and 138b are individuals working in the first facility 102. In one embodiment, the first and second operators 138a and 138b traverse along the optimal routes identified by the inventory management server 104 with the loaded transport units 132 for fulfilling the inventory items at the corresponding nodes N. The first and second operators 138a and 138b may use transport unit holders to move the loaded transport units 132 along the optimal routes. In another embodiment, the first facility 102 may have automated robots (such as automatic guided vehicles, i.e., AGVs) similar to the first and second transporters 124a and 124b for moving the loaded transport units 132 along the optimal routes for fulfilling the inventory items in the corresponding nodes N. Navigation details of the optimal routes are communicated to operator devices (as shown in FIG. 10) of the first and second operators 138a and 138b by the inventory management server 104 by way of the first facility device 116. Identification of the optimal routes is described later in conjunction with FIG. 3.

The communication network 108 is a medium through which content and messages are transmitted between the inventory management server 104 and the first and second facility devices 116 and 122. Examples of the communication network 108 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 108 in accordance with various wired and wireless communication protocols, such as Transmission Control Protocol and Internet Protocol (TCP/IP), User Datagram Protocol (UDP), $2^{nd}$ Generation (2G), 3rd Generation (3G), $4^{th}$ Generation (4G), $5^{th}$ Generation (5G) communication protocols, Long Term Evolution (LTE) communication protocols, or any combination thereof.

It will be apparent to a person having ordinary skill in the art that the first facility 102 is shown for illustrative purpose and should not be construed to limit the scope of the disclosure. In another embodiment, the first facility 102 may be a multistory building having multiple floors dedicated to multiple departments. For example, when the first facility 102 is a multistory building, the first and second departments $D_1$ and $D_2$ may be on ground and first floors, respectively. In this embodiment, the inventory management server 104 uses the multistory layout of the first facility 102 for identifying the optimal routes in the first facility 102 for fulfilling the inventory items in the corresponding nodes N.

FIG. 2 is a block diagram of an exemplary scenario 200 that illustrates the first aisle 112a, in accordance with an embodiment of the present disclosure. The first aisle 112a is formed between the display faces of the first and second display racks 110a and 110b and has $E_1$ and $E_2$ as first and second entry/exit points, respectively. A customer (or the first and second operators 138a and 138b), who moves along the first aisle 112a, may enter the first aisle 112a from any of the first and second entry/exit points $E_1$ and $E_2$. Entry/exit points $E_1$ and $E_2$ have location co-ordinates as $(x_1, y_1)$ and $(x_2, y_2)$, respectively. Likewise, the second through fifth aisles 112b-112e have their corresponding entry/exit points.

The first display rack 110a has the first through eighth nodes $N_1$-$N_8$ and the second display rack 110b has the ninth through sixteenth nodes $N_9$-$N_{16}$ that are accessible from the first aisle 112a. As the first aisle 112a is within the food department $D_1$ and associated with fresh fruits, each of the first through sixteenth nodes $N_1$-$N_{16}$ stores a specific fruit. For example, the first node $N_1$ stores apples 202a and the ninth node $N_9$ stores pineapples 202b. The first through sixteenth nodes $N_1$-$N_{16}$ for which the number of inventory items fall below the threshold value correspond to fulfillment nodes. Likewise, the first through sixteenth nodes $N_1$-$N_{16}$ that are allocated to new inventory items to be sold in the first facility 102 also correspond to the fulfillment nodes. For example, the number of inventory items in the first node $N_1$ is 100 whereas the number of inventory items in the fourth node $N_4$ is 15. Thus, the fourth node $N_4$ corresponds to the fulfillment node. The sixteenth node $N_{16}$ that is empty and allocated to jack fruits (i.e., the new inventory item), also corresponds to the fulfillment node. Likewise, the second through fifth aisles 112b-112e have corresponding associated nodes N as described in FIG. 1.

It will be apparent to a person having ordinary skill in the art that the first aisle 112a and the first and second display racks 110a and 110b are shown for illustrative purposes and should not be construed to limit the scope of the disclosure. In another embodiment, the first aisle 112a may be a circular aisle, a U-shaped aisle, or have any other layout instead of the rectangular layout without deviating from the scope of the disclosure.

Figure 3:
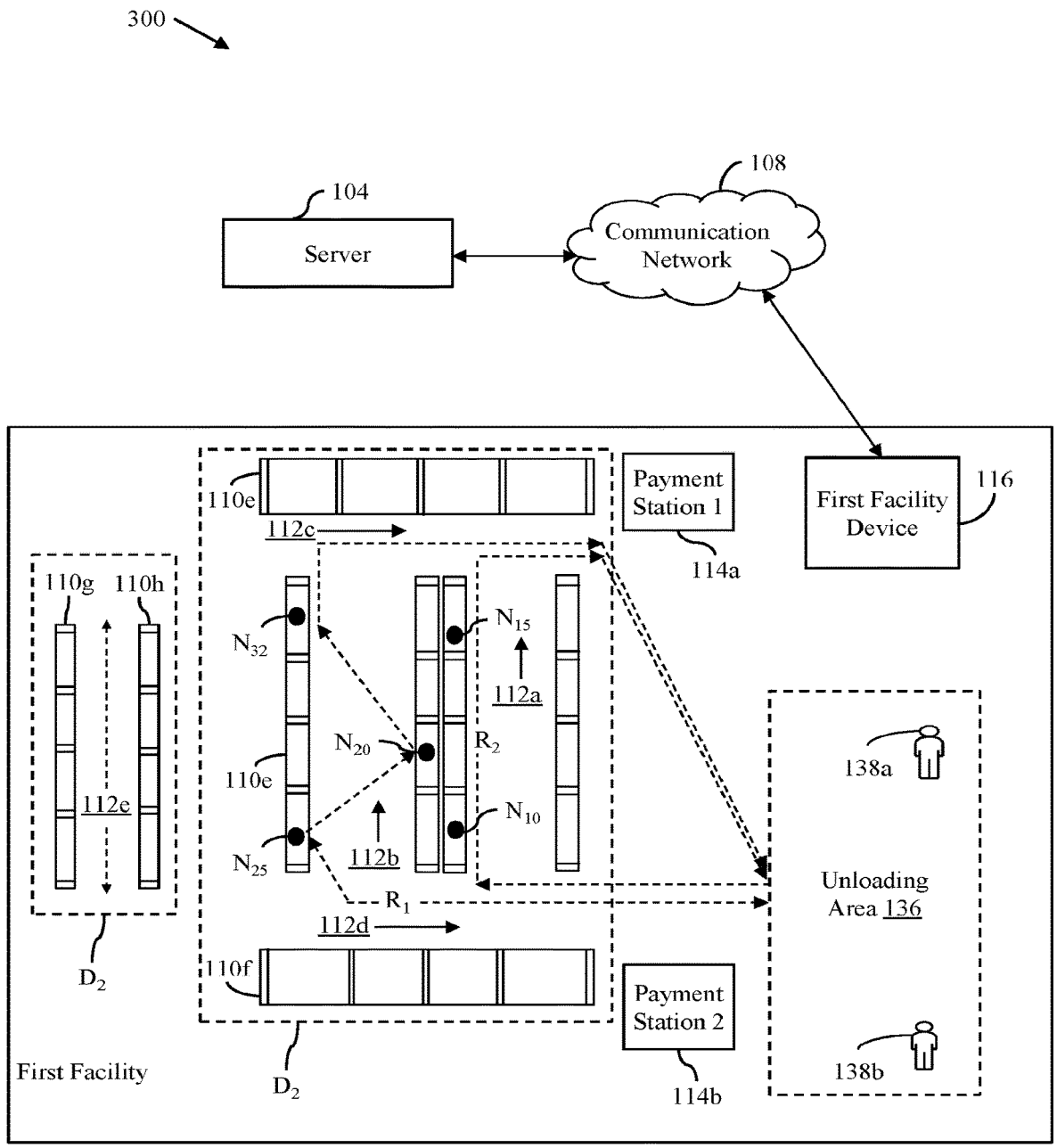
FIG. 3 is a block diagram of an exemplary scenario that illustrates identification of optimal routes and determination of packing instructions by an inventory management server of FIG. 1, in accordance with an embodiment of the present disclosure.

FIG. 3 is a block diagram of an exemplary scenario 300 that illustrates the identification of optimal routes and the determination of packing instructions by the inventory management server 104, in accordance with an embodiment of the present disclosure.

The first facility device 116 communicates a first request to the inventory management server 104 for fulfilling inventory items, such as items A, B, C, D, and E. In one example, the items A, B, C, D, and E are oranges, melons, tomatoes, pumpkins, and onions, respectively. The first request includes a number of units of each inventory item required for fulfillment. For example, the first request may specify that 200 units of oranges, 300 units of melons, 200 units of tomatoes, 150 units of pumpkins, and 250 units of onions are required in the first facility 102. Likewise, facility devices of other retail facilities may also communicate first requests to the inventory management server 104 for fulfilling corresponding inventory items. The inventory management server 104 may use a first-in-first-out approach or other parameters, such as an urgency parameter and a volume parameter, to prioritize the first requests from the retail facilities. For the sake of simplicity, the operations performed by the inventory management server 104 are explained with respect to the first request from the first facility 102. However, it will be understood by those of skill in the art that the inventory management server 104 processes the first requests of other retail facilities in a manner similar to the first request of the first facility 102.

Figure 9:
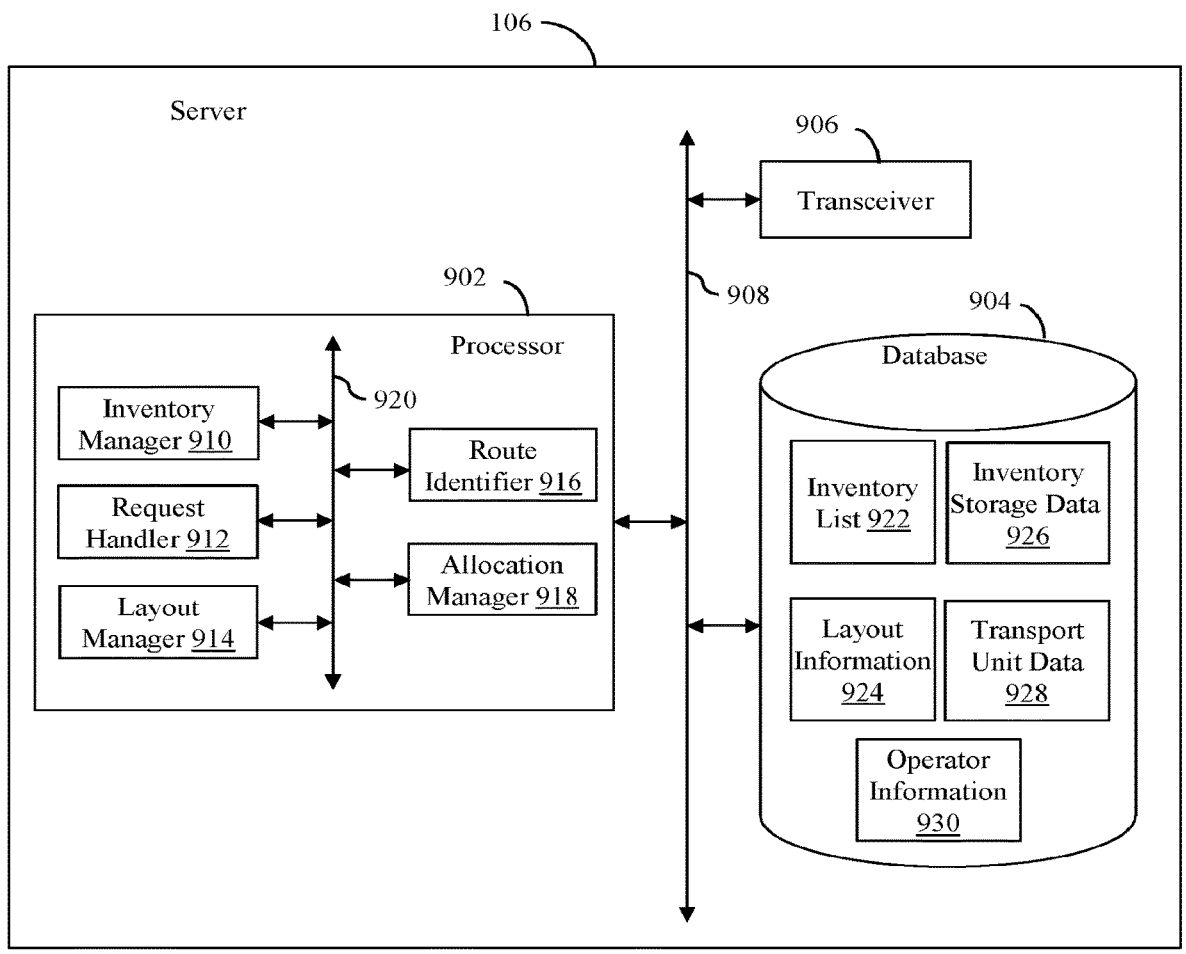
FIG. 9 is a block diagram that illustrates the inventory management server, in accordance with an embodiment of the present disclosure.

The inventory management server 104 checks whether the second facility 106 has sufficient units of each inventory item specified in the first request by referring to an inventory list of the second facility 106. The inventory management server 104 maintains the inventory list in a database (as shown in FIG. 9). The inventory list has a record, such as numbers of units and volume of each unit, of all inventory items that are stored in the second facility 106. When the inventory management server 104 determines that the second facility 106 has sufficient units of each inventory item specified in the first request, or in some embodiments sufficient units of at least one inventory item specified in the first request, the inventory management server 104 retrieves the layout information of the first facility 102 from the database.

The layout information of the first facility 102 includes information of a layout of the first facility 102, such as location data of the food and apparels departments $D_1$ and $D_2$, location data of the aisles 112, location data of the nodes N, and location co-ordinates of the unloading area 136. The location data of the food and apparels departments $D_1$ and $D_2$ includes location co-ordinates (such as x and y co-ordinates) of entry/exit points of each department. The location data of the aisles 112 includes the location co-ordinates (such as x and y co-ordinates) of the entry/exit points of each aisle 112 and the location data of the nodes N includes location co-ordinates (such as x and y co-ordinates) of the nodes N. The layout information is further indicative of an association between the aisles 112 and the nodes N. For example, the layout information includes information that the first aisle 112a is associated with the first through sixteenth nodes $N_1$-$N_{16}$. The layout information is further indicative of an association between the nodes N and the inventory items sold in the first facility 102, respectively. For example, the layout information includes information that the first node $N_1$ is associated with the apples 202a, and the ninth node $N_9$ is associated with the pineapples 202b. In one embodiment, the layout information may include information of the nodes N that are empty and not associated with any inventory item. In another embodiment, the layout information may further include real-time path availability information of various paths in the first facility 102. The layout information may be stored in the database in a tabular format, a geographical map format, or any other format known to those of skill in the art.

The inventory management server 104 uses the retrieved layout information to identify nodes (i.e., fulfillment nodes) that correspond to the inventory items specified in the first request. In a non-limiting example, the inventory management server 104 identifies that the items A, B, C, and D are associated with the nodes $N_{10}$, $N_{15}$, $N_{20}$, and $N_{25}$, respectively. The inventory management server 104 further finds out that the item E is a newly launched inventory item, and thus, may not be associated with any of the nodes N. In such a scenario, the inventory management server 104 determines a category of the item E (i.e., the onions), which is fresh vegetables. Based on the identified category of the item E, the inventory management server 104 assigns an empty node (such as the node $N_{32}$) in the fresh vegetables aisle 112b (i.e., the second aisle 112b) to the item E. Thus, the identified nodes $N_{10}$, $N_{15}$, $N_{20}$, $N_{25}$, and $N_{32}$ are the fulfillment nodes $N_{10}$, $N_{15}$, $N_{20}$, $N_{25}$, and $N_{32}$. The inventory management server 104 then checks the retrieved layout information to identify aisles that include the fulfillment nodes $N_{10}$, $N_{15}$, $N_{20}$, $N_{25}$, and $N_{32}$. In this scenario, the inventory management server 104 identifies that the first aisle 112a includes the fulfillment nodes $N_{10}$ and $N_{15}$ and the second aisle 112b includes the fulfillment nodes $N_{20}$, $N_{25}$, and $N_{32}$. The inventory management server 104 further retrieves the location co-ordinates of the entry/exit points of the identified aisles (i.e., the first and second aisles 112a and 112b) and the location co-ordinates of the fulfillment nodes $N_{10}$, $N_{15}$, $N_{20}$, $N_{25}$, and $N_{32}$. For example, the location co-ordinates of the first and second entry/exit points of the first aisle 112a are $(x_1,y_1)$ and $(x_2,y_2)$, respectively, and the location co-ordinates of the entry/exit points of the second aisle 112b are $(x_3,y_3)$ and $(x_4,y_4)$, respectively. The retrieved location co-ordinates of the fulfillment nodes $N_{10}$, $N_{15}$, $N_{20}$, $N_{25}$, and $N_{32}$ are $(x_5,y_5)$, $(x_6,y_6)$, $(x_7,y_7)$, $(x_8,y_8)$, and $(x_9,y_9)$, respectively. The inventory management server 104 further checks the retrieved layout information to identify departments that include the identified aisles 112a and 112b. In this scenario, the inventory management server 104 identifies that the food department $D_1$ includes the first and second aisles 112a and 112b. The inventory management server 104 further retrieves the location co-ordinates of the entry/exit points of the food department $D_1$. For example, the location co-ordinates of first and second entry/exit points of the food department $D_1$ are $(x_{10},y_{10})$ and $(x_{11},y_{11})$.

It will be apparent to a person having ordinary skill in the art that the scope of the disclosure is not limited to identifying the fulfillment nodes and aisles from a single department. In another embodiment, the fulfillment nodes and corresponding aisles may be associated with multiple departments of the first facility 102.

The inventory management server 104 further determines volumetric requirement of each fulfillment node $N_{10}$, $N_{15}$, $N_{20}$, $N_{25}$, and $N_{32}$ based on the number of units of corresponding inventory item (such as items A, B, C, D, and E) required for fulfillment and volume of each unit of the corresponding inventory item. For example, the volumes of each unit of the items A, B, C, D, and E may be $V_1$, $V_2$, $V_3$, $V_4$, and $V_5$, respectively. Thus, the volumetric requirement of the fulfillment node $N_{10}$ is a product of the volume $V_1$ and the number of units (i.e., 200) of oranges required for fulfillment. Likewise, the inventory management server 104 determines the volumetric requirements of the fulfillment nodes $N_{15}$, $N_{20}$, $N_{25}$, and $N_{32}$. The inventory management server 104 then retrieves transport unit data (as shown in FIG. 9) of the transport units 132 from the database. The transport unit data includes data pertaining to capacities, dimensions, number of bins, and size of each bin of the transport units 132.

The inventory management server 104 then uses multiple parameters as inputs for identifying the optimal routes to be traversed by the transport units 132 in the first facility 102 for fulfilling the items A, B, C, D, and E at the fulfillment nodes $N_{10}$, $N_{15}$, $N_{20}$, $N_{25}$, and $N_{32}$, respectively. The parameters include the location co-ordinates of the entry/exit points of the food department $D_1$, the location co-ordinates of the entry/exit points of the first and second aisles 112a and 112b, the location co-ordinates of the unloading area 136, the location co-ordinates and the volumetric requirements of the fulfillment nodes $N_{10}$, $N_{15}$, $N_{20}$, $N_{25}$, and $N_{32}$, and the transport unit data of the transport units 132. The inventory management server 104 uses the transport unit data of the transport units 132 to determine capacities of the transport units 132. The inventory management server 104 further uses the location co-ordinates of the entry/exit points of the food department $D_1$ and the first and second aisles 112a and 112b, and the location co-ordinates of the fulfillment nodes $N_{10}$, $N_{15}$, $N_{20}$, $N_{25}$, and $N_{32}$ to determine distance between each pair of the fulfillment nodes $N_{10}$, $N_{15}$, $N_{20}$, $N_{25}$, and $N_{32}$. In other words, the inventory management server 104 uses the capacities of the transport units 132, the volumetric requirements of the fulfillment nodes $N_{10}$, $N_{15}$, $N_{20}$, $N_{25}$, and $N_{32}$, and distance between each pair of the fulfillment nodes $N_{10}$, $N_{15}$, $N_{20}$, $N_{25}$, and $N_{32}$ to identify the optimal routes.

For the identification of the optimal routes, the inventory management server 104 identifies an intermediate route for each of the fulfillment nodes $N_{10}$, $N_{15}$, $N_{20}$, $N_{25}$, and $N_{32}$. Table 400, as shown in FIG. 4, illustrates first through fifth intermediate routes $IR_{10}$, $IR_{20}$, $W_{25}$, and $IR_{32}$ identified by the inventory management server 104. For example, the first intermediate route $IR_{10}$ (as shown in Table 400) has the unloading area 136 (i.e., 'O') as its source and destination and the fulfillment node $N_{10}$ as an intermediate stop. Likewise, the second intermediate route $IR_{15}$ has the unloading area 136 as its source and destination and the fulfillment node $N_{15}$ as an intermediate stop. After identifying the intermediate routes as illustrated in Table 400, the inventory management server 104 determines a volumetric requirement of each intermediate route. The volumetric requirement of an intermediate route is a sum of volumetric requirements of all the fulfillment nodes in the intermediate route. For example, the volumetric requirement of the second intermediate route $IR_{15}$ is equal to the volumetric requirement of the fulfillment node $N_{15}$. Table 400 further illustrates the volumetric requirement of each of intermediate route. The inventory management server 104 stores information pertaining to the intermediate routes and the corresponding volumetric requirements in the database. In one example, the information pertaining to the intermediate routes and the corresponding volumetric requirements may be stored in a tabular format as shown in Table 400.

The inventory management server 104 then determines a distance saving factor for each pair of fulfillment nodes $N_{10}$, $N_{15}$, $N_{20}$, $N_{25}$, and $N_{32}$. The distance saving factor for a pair of nodes is indicative of an extra distance that is saved from being traversed when both the nodes are covered in a single route instead of two separate routes. The inventory management server 104 determines the distance saving factor based on equation 1 below:

$$S_{ij}=d_{oi}+d_{oj}-d_{ij} \qquad (1)$$

where, $S_{ij}$ is the distance saving factor for $i^{th}$ and $j^{th}$ fulfillment nodes;

$d_{oi}$ is a shortest distance between the unloading area 136 and the $i^{th}$ fulfillment node;

$d_{oj}$ is a shortest distance between the unloading area 136 and the $i^{th}$ fulfillment node; and $d_{ij}$ is a shortest distance between the $i^{th}$ and $j^{th}$ fulfillment nodes.

In a non-limiting example, the first facility 102 is assumed to have a rectangular layout, thus the inventory management server 104 determines the shortest distance between any two locations by using Manhattan distance computation technique. The inventory management server 104 determines the shortest distance between the $i^{th}$ and $j^{th}$ fulfillment nodes, when the $i^{th}$ and $j^{th}$ fulfillment nodes are accessible from a same aisle $a_m$ based on equation 2:

$$d_{ij}=|x_i-x_j|+|y_i-y_j| \qquad (2)$$

where, $x_i$ is an x co-ordinate of the $i^{th}$ fulfillment node;

$y_i$ is a y co-ordinate of the $i^{th}$ fulfillment node;

$x_j$ is an x co-ordinate of the $i^{th}$ fulfillment node; and $y_j$ is a y co-ordinate of the $j^{th}$ fulfillment node.

The inventory management server 104 determines the shortest distance between the $i^{th}$ and $j^{th}$ fulfillment nodes, when the $i^{th}$ and $j^{th}$ fulfillment nodes are accessible from two different aisles $a_n$, and $a_n$, respectively, based on any of equations 3-6 below that has the smallest result:

$$d_{ij}=\{d(i,a_{m1})+d(a_{m1},a_{n1})+d(a_{n1},j)\} \qquad (3)$$

$$d_{ij}=\{d(i,a_{m1})+d(a_{m1},a_{n2})+d(a_{n2},j)\} \qquad (4)$$

$$d_{ij}=\{d(i,a_{m2})+d(a_{m2},a_{n1})+d(a_{n1},j)\} \qquad (5)$$

$$d_{ij}=\{d(i,a_{m2})+d(a_{m2},a_{n2})+d(a_{n2},j)\} \qquad (6)$$

where, $d(i, a_{m1})$ is a shortest distance between the $i^{th}$ fulfillment node and a first entry/exit point (i.e., $a_{m1}$) of the aisle $a_n$, such that d(a, b) is determined based on equation 1;

$d(a_{m1}, a_{n1})$ is a shortest distance between the first entry/exit point (i.e., $a_{m1}$) of the aisle $a_m$ and a first entry/exit point (i.e., $a_{n1}$) of the aisle $a_n$;

$d(a_{n1},j)$ is a shortest distance between the first entry/exit point (i.e., $a_{n1}$) of the aisle $a_n$ and the $j^{th}$ fulfillment node;

$d(a_{m1}, a_{n2})$ is a shortest distance between the first entry/exit point (i.e., $a_{m1}$) of the aisle $a_m$ and a second entry/exit point (i.e., $a_{n2}$) of the aisle $a_n$;

$d(a_{n2},j)$ is a shortest distance between the second entry/exit point (i.e., $a_{n2}$) of the aisle $a_n$ and the $j^{th}$ fulfillment node;

$d(i, a_{m2})$ is a shortest distance between $i^{th}$ fulfillment node and a second entry/exit point (i.e., $a_{m2}$) of the aisle $a_m$;

$d(a_{m2}, a_{n1})$ is a shortest distance between the second entry/exit point (i.e., $a_{n2}$) of the aisle $a_m$ and the first entry/exit point (i.e., $a_{n1}$) of the aisle $a_n$; and $d(a_{m2}, a_{n2})$ is a shortest distance between the second entry/exit point (i.e., $a_{m2}$) of the aisle $a_m$ and the second entry/exit point (i.e., $a_{n2}$) of the aisle $a_n$.

It will be apparent to a person having ordinary skill in the art that the abovementioned equations 1-6 are for illustrative purpose and should not be construed to limit the scope of the disclosure. In another embodiment, the inventory management server 104 may use any other distance computation technique such as Dijkstra algorithm and greedy algorithm without deviating from the scope of the disclosure for the determination of the distance saving factor for each pair of fulfillment nodes $N_{10}$, $N_{15}$, $N_{20}$, $N_{25}$, and $N_{32}$.

After determining the distance saving factor for each pair of the fulfillment nodes $N_{10}$, $N_{15}$, $N_{20}$, $N_{25}$, and $N_{32}$, the inventory management server 104 sorts all the distance saving factors in a descending order. It will be apparent to a person having ordinary skill in the art that the inventory management server 104 may sort the distance saving factors in an ascending order without deviating from the scope of the disclosure. Table 500, as shown in FIG. 5, illustrates the sorted distance saving factors and the fulfillment nodes corresponding to each distance saving factor. For example, $S_{10,15}$, as shown in Table 500, represents the distance saving factor of the fulfillment nodes $N_{10}$ and $N_{15}$. The inventory management server 104 stores the sorted distance saving factors in the database.

After sorting the distance saving factors, the inventory management server 104 selects the fulfillment nodes having the highest distance saving factor. The inventory management server 104 then selects two intermediate routes that include the selected fulfillment nodes. The inventory management server 104 selects the intermediate routes based on at least first through third route merging rules. The first route merging rule may state that the inventory management server 104 must select one intermediate route for each of the selected fulfillment nodes such that each selected intermediate route includes only one of the selected fulfillment nodes. The second route merging rule may state that the inventory management server 104 must select one intermediate route for each of the selected fulfillment nodes such that the selected fulfillment nodes are either immediately followed by or preceded by the unloading area 136 (i.e., O) in the corresponding selected intermediate route. The third route merging rule may state that the inventory management server 104 must select one intermediate route for each of the selected fulfillment nodes such that the sum of the volumetric requirements of the selected intermediate routes is less than or equal to the capacity of at least one transport unit among the transport units 132.

With reference to Table 500, $S_{20,25}$ is the highest distance saving factor, thus the inventory management server 104 selects the fulfillment nodes $N_{20}$ and $N_{25}$. After the selection of the fulfillment nodes $N_{20}$ and $N_{25}$, the inventory management server 104 selects the intermediate routes that include the fulfillment nodes $N_{20}$ and $N_{25}$ based on at least the first through third route merging rules. The third and fourth intermediate routes $IR_{20}$ and $IR_{25}$ satisfy the first through third route merging rules. As the third and fourth intermediate routes $IR_{20}$ and $IR_{25}$ include the fulfillment nodes $N_{20}$ and $N_{25}$, respectively, that are immediately followed by the unloading area 136 in their respective intermediate routes $IR_{20}$ and $IR_{25}$. Furthermore, the sum of the volumetric requirements of the third and fourth intermediate routes $IR_{20}$ and $IR_{25}$ is less than the capacity of the first and second transport units 132a and 132b. After the selection of the third and fourth intermediate routes $IR_{20}$ and $IR_{25}$, the inventory management server 104 merges the third and fourth intermediate routes $IR_{20}$ and $IR_{25}$ to obtain a sixth intermediate route $IR_{new1}$. The sixth intermediate route $IR_{new1}$ has the unloading area 136 as the source and destination and the fulfillment nodes $N_{20}$ and $N_{25}$ as the intermediate stops, i.e., O->$N_{25}$->$N_{20}$->O. The volumetric requirement of the sixth intermediate route $IR_{new1}$ is the sum of the volumetric requirements of the fulfillment nodes $N_{20}$ and $N_{25}$. Once the third and fourth intermediate routes $IR_{20}$ and $IR_{25}$ are merged, the inventory management server 104 erases the distance saving factor $S_{20,25}$ from the database and replaces the third and fourth intermediate routes $IR_{20}$ and $IR_{25}$ with the sixth intermediate route $IR_{new1}$. Thus, the updated intermediate routes do not include the third and fourth intermediate routes $IR_{20}$ and $IR_{25}$. The inventory management server 104 then again selects the fulfillment nodes having the highest distance saving factor after the distance saving factor $S_{20,25}$ has been erased.

With reference to Table 500, $S_{10,25}$ is the next highest distance saving factor, thus the inventory management server 104 selects the fulfillment nodes $N_{10}$ and $N_{25}$. The inventory management server 104 then selects the intermediate routes that include the fulfillment nodes $N_{10}$ and $N_{25}$. The intermediate routes that satisfy the first and second route merging rules are the sixth and first intermediate routes $IR_{new1}$ and $IR_{10}$. In one example, the inventory management server 104 may find out that the sum of the volumetric requirements of the sixth and first intermediate routes $IR_{new1}$ and $IR_{10}$ is greater than the capacity of each of the transport units 132. In this scenario, the inventory management server 104 may erase the distance saving factor $S_{10,25}$ without merging the sixth and first intermediate routes $IR_{new1}$ and $IR_{10}$.

With reference to Table 500, $S_{20,32}$ is the next highest distance saving factor after the distance saving factor $S_{10,25}$ has been erased, thus the inventory management server 104 selects the fulfillment nodes $N_{20}$ and $N_{32}$. The inventory management server 104 then selects the intermediate routes that include the fulfillment nodes $N_{20}$ and $N_{32}$. The intermediate routes that satisfy the first and second route merging rules are the sixth and fifth intermediate routes $IR_{new1}$ and $IR_{32}$, as the sixth and fifth intermediate routes $IR_{new1}$ and $IR_{32}$ include the fulfillment nodes $N_{20}$ and $N_{32}$, respectively, that are immediately followed by the unloading area 136. Further, the inventory management server 104 may find out that the sum of the volumetric requirements of the sixth and fifth intermediate routes $IR_{new1}$ and $IR_{32}$ is equal to the capacity of the first transport unit 132a. The inventory management server 104 thus merges the sixth and fifth intermediate routes $IR_{new1}$ and $IR_{32}$ to obtain a seventh intermediate route $IR_{new2}$. The seventh intermediate route $IR_{new2}$ has the unloading area 136 as the source and destination and the fulfillment nodes $N_{20}$, $N_{25}$, and $N_{32}$ as the intermediate stops, i.e., O->$N_{25}$->$N_{20}$->$N_{32}$->O. The volumetric requirement of the seventh intermediate route $IR_{new2}$ is the sum of the volumetric requirements of the fulfillment nodes $N_{20}$, $N_{25}$, and $N_{32}$. The inventory management server 104 then erases the distance saving factor $S_{20,32}$ and replaces the sixth and fifth intermediate routes $IR_{new1}$ and $IR_{32}$ with the seventh intermediate route $IR_{new2}$. The inventory management server 104 again selects the fulfillment nodes having the highest distance saving factor after the distance saving factor $S_{20,25}$ has been erased.

With reference to Table 500, $S_{25,32}$ is the next highest distance saving factor after the distance saving factor $S_{20,25}$ has been erased, thus the inventory management server 104 selects the fulfillment nodes $N_{25}$ and $N_{32}$. The inventory management server 104 finds out that the seventh intermediate route $IR_{new2}$ is the only intermediate route including the fulfillment nodes $N_{25}$ and $N_{32}$. Hence, the inventory management server 104 determines that the first route merging rule is not satisfied as both the fulfillment nodes $N_{25}$ and $N_{32}$ fall in the same intermediate route. The inventory management server 104 thus erases the distance saving factor $S_{25,32}$ without merging any intermediate routes.

With reference to Table 500, $S_{10,15}$ is the next highest distance saving factor after the distance saving factor $S_{25,32}$ has been erased, thus the inventory management server 104 selects the fulfillment nodes $N_{10}$ and $N_{15}$. The inventory management server 104 finds out that the first and second intermediate routes $IR_{10}$ and $IR_{15}$ satisfy the first through third route merging rules and thus merges the first and second intermediate routes $IR_{10}$ and $IR_{15}$ to obtain an eighth intermediate route $IR_{new3}$. The eighth intermediate route $IR_{new3}$ has the unloading area 136 as the source and destination and the fulfillment nodes $N_{10}$ and $N_{15}$ as the intermediate stops, i.e., O->$N_{10}$->$N_{15}$->O The volumetric requirement of the eighth intermediate route $IR_{new3}$ is the sum of the volumetric requirements of the fulfillment nodes $N_{10}$ and $N_{15}$. The inventory management server 104 then erases the distance saving factor $S_{10,15}$ from the database and replaces the first and second intermediate routes $IR_{10}$ and $IR_{15}$ with the eighth intermediate route $IR_{new3}$. The inventory management server 104 again selects the fulfillment nodes having the highest distance saving factor after the distance saving factor $S_{10,15}$ has been erased.

With reference to Table 500, $S_{10,20}$ is the next highest distance saving factor after the distance saving factor $S_{10,15}$ has been erased, thus the inventory management server 104 selects the fulfillment nodes $N_{10}$ and $N_{20}$. The inventory management server 104 finds out that the seventh and eighth intermediate routes $IR_{new2}$ and $IR_{new3}$ include the fulfillment nodes $N_{20}$ and $N_{10}$, respectively. However, the fulfillment node $N_{20}$ in the seventh intermediate route $IR_{new2}$ is not immediately followed by or preceded by the unloading area 136. Hence, the inventory management server 104 determines that the second route merging rule is not satisfied. The inventory management server 104 thus erases the distance saving factor $S_{10,20}$ from the database without merging the seventh and eighth intermediate routes $IR_{new2}$ and $IR_{new3}$.

Likewise, the inventory management server 104 checks all the remaining distance saving factors until all the distance saving factors are erased from the database and there are no more routes that could be merged based on the first through third route merging rules. The intermediate routes that are obtained when all the distance saving factors have been erased correspond to the optimal routes. In this scenario, the inventory management server 104 identifies first and second optimal routes $R_1$ and $R_2$ (i.e., the seventh and eighth intermediate routes $IR_{new2}$ and $IR_{new3}$, respectively). The first optimal route $R_1$ is O->$N_{25}$->$N_{20}$->$N_{32}$->O, and the second optimal route $R_2$ is O->$N_{10}$->$N_{15}$->O. The first optimal route $R_1$ caters to the fulfillment nodes $N_{25}$, $N_{20}$, and $N_{32}$ sequentially for fulfilling the items D, C, and E, respectively. Likewise, the second optimal route $R_2$ caters to the fulfillment nodes $N_{10}$ and $N_{15}$ sequentially for fulfilling the items A and B, respectively. In other words, the inventory management server 104 segregates the inventory items included in the first request into two clusters by identifying the first and second optimal routes $R_1$ and $R_2$. The first cluster includes the items D, C, and E associated with the fulfillment nodes $N_{25}$, $N_{20}$, and $N_{32}$, respectively, catered to by the first optimal route $R_1$ and the second cluster includes the items A and B associated with the fulfillment nodes $N_{10}$ and $N_{15}$, respectively, catered to by the second optimal route $R_2$.

It will be apparent to a person having ordinary skill in the art that the optimal routes may also be identified by any other route identification technique (such as travelling salesman algorithm, capacitated vehicle routing algorithm, and genetic algorithm) known in the art without deviating from the scope of the disclosure. Further, the scope of the disclosure is not limited to the use of distance saving factor for identifying the optimal routes. Various other factors, such as ease of traversing along a route and availability of routes in the first facility 102, may be used to identify the optimal routes without departing from the spirit of the disclosure. In one embodiment, due to maintenance in the first facility 102 various routes may not be available for traversing. In such a scenario, the inventory management server 104 uses the real-time path availability information while identifying the optimal routes for fulfilling the fulfillment nodes $N_{10}$, $N_{15}$, $N_{25}$, $N_{20}$, and $N_{32}$. For example, if the second optimal route $R_2$ is unavailable, the inventory management server 104 may identify an alternate optimal route instead of the second optimal route $R_2$ for fulfilling the fulfillment nodes $N_{10}$ and $N_{15}$.

The inventory management server 104 allocates the first transport unit 132a to the items C, D, and E associated with the fulfillment nodes $N_{25}$, $N_{20}$, and $N_{32}$ of the first optimal route $R_1$ as the volumetric requirement of the first optimal route $R_1$ is equal to the capacity of the first transport unit 132a. Further, the inventory management server 104 has an option to allocate one of the second and third transport units 132b and 132c to the items A and B associated with the fulfillment nodes $N_{10}$ and $N_{15}$ of the second optimal route $R_2$ as the volumetric requirement of the second optimal route $R_2$ is less than the capacities of the second and third transport units 132b and 132c. In such a scenario, when the inventory management server 104 has an option to choose between the second and third transport units 132b and 132c, the inventory management server 104 checks a capacity utilization factor for both the second and third transport units 132b and 132c. The capacity utilization factor of a transport unit indicates a percentage of capacity utilized if the transport unit is loaded with the inventory items to be allocated. In the present example, the inventory management server 104 may determine that the capacity utilization factor of the second transport unit 132b is greater than the capacity utilization factor of the third transport unit 132c. Thus, the inventory management server 104 allocates the second transport unit 132b to the items A and B associated with the fulfillment nodes $N_{10}$ and $N_{15}$ of the second optimal route $R_2$.

The inventory management server 104 then performs bin mapping for each allocated transport unit (i.e., the first and second transport units 132a and 132b). Bin mapping is a process in which the inventory management server 104 determines a one-to-one correspondence between the bins 134 of the allocated transport units and the corresponding inventory items for loading the inventory items into or onto the bins 134. For example, the bin mapping of the first transport unit 132a includes mapping the allocated items D, C, and E to the first through third bins 134a-134c of the first transport unit 132a and the bin mapping of the second transport unit 132b includes mapping the allocated items A and B to the fourth through sixth bins 134d-134f of the second transport unit 132b. The inventory management server 104 performs the bin mapping based on at least one of centers of gravity of the first and second transport units 132a and 132b, dimensions of the first and second transport units 132a and 132b, capacities of the bins 134, characteristics (such as fragility, crushability, shape, and dimensions) of the items A, B, C, D, and E (i.e., the oranges, melons, tomatoes, pumpkins, and onions, respectively), weights of the items A, B, C, D, and E, and a sequence of the fulfillment nodes in the corresponding optimal route. For example, while mapping the first through third bins 134a-134c to tomatoes, pumpkins, and onions, the inventory management server 104 may allocate the lowest bin (i.e., the third bin 134c) to the heaviest item (e.g., pumpkins) so as to lower the center of gravity of the first transport unit 132a and prevent the first transport unit 132a from tipping. The inventory management server 104 may further allocate tomatoes to the topmost bin (i.e., the first bin 134a) due it its crushable (i.e., fragile) nature so as to prevent any damage to tomatoes while shipping. Further, the inventory management server 104 may allocate the onions to the second bin 134b as the dimensions and the capacity of the second bin 134b supports the loading of onions. Likewise, the inventory management server 104 maps the fourth through sixth bins 134d-134f to the items oranges and melons. For example, the inventory management server 104 may allocate the melons to the fifth and sixth bins 134e and 134f and the oranges to the fourth bin 134d (i.e., the top-most bin) as the fulfillment node $N_{10}$ is prior to the fulfillment node $N_{15}$ in the second optimal route $R_2$ and the melons are heavier than the oranges. Thus, the inventory management server 104 takes into consideration the sequence of the fulfillment nodes in the corresponding optimal route while performing the bin mapping. In one embodiment, preference of one parameter may supersede other parameters during the bin mapping. For example, in one scenario, the preference of optimizing the center of gravity of the allocated transport unit 132a or 132b may supersede the sequence of the fulfillment nodes in the corresponding optimal route.

Upon completion of the bin mapping process, the inventory management server 104 communicates the first request and the packing instructions to the second facility device 122 for initiating the loading and packing of the items A, B, C, D, and E in the corresponding mapped bins. The packing instructions include details of loading the first transport unit 132a with items C, D, and E and the second transport unit 132b with items A and B. The packing instructions further include details of the bin mapping of each of the first through sixth bins 134a-134f of the first and second transport units 132a and 132b.

It will be apparent to a person having ordinary skill in the art the first and second optimal routes $R_1$ and $R_2$ are for illustrative purpose and should not be construed to limit the scope of the disclosure. In an embodiment, the inventory management server 104 may merge two selected intermediate routes including fulfillment nodes from different aisles, if the first through third route merging rules are satisfied. In another embodiment, the inventory management server 104 may not merge two selected intermediate routes if the inventory items corresponding to the two selected intermediate routes are not compatible or have a negative affinity. For example, the inventory management server 104 may not merge an intermediate route associated with grocery items with another intermediate route associated with pesticides. In another embodiment, the inventory management server 104 may not merge two selected intermediate routes if a path for merging the two selected intermediate routes is unavailable as per the real-time path availability information.

In one embodiment, when the inventory items included in the first request also correspond to nodes of the apparels department $D_2$, the inventory management server 104 may identify optimal routes for fulfilling the nodes of the apparels department $D_2$ and allocate the transport units 132 to the optimal routes of the apparels department $D_2$. The identification of the optimal routes and the allocation of the transport units 132 for fulfilling the nodes of the apparels department $D_2$ is similar to the identification of the first and second optimal routes $R_1$ and $R_2$ and the allocation of the first and second transport units 132a and 132b, respectively. In other words, the inventory management server 104 performs two layers of segregation for the inventory items included in the first request. The first layer of segregation is a department-based segregation and the second layer of segregation is an optimal route-based segregation.

In one embodiment, the inventory management server 104 may receive two separate first requests from the food and apparels departments $D_1$ and $D_2$ for fulfillment of the inventory items. In such a scenario, the inventory management server 104 may merge the first requests from the food and apparels departments $D_1$ and $D_2$ so as to have a single shipment catering to both first requests, thereby optimizing the shipment. In another embodiment, the inventory management server 104 may optimize a shipment to the first facility 102 by merging multiple fulfillment requests from the first facility 102. For example, the inventory management server 104 may merge all the first requests that are received from the first facility 102 within a first-time interval, such as a day, a week, or the like, so as to have a single shipment catering to all the merged requests. It will be apparent to a person having ordinary skill in the art that the inventory management server 104 may use any other criteria as well for merging the first requests from the first facility 102 for optimizing the shipment.

Figure 6A:
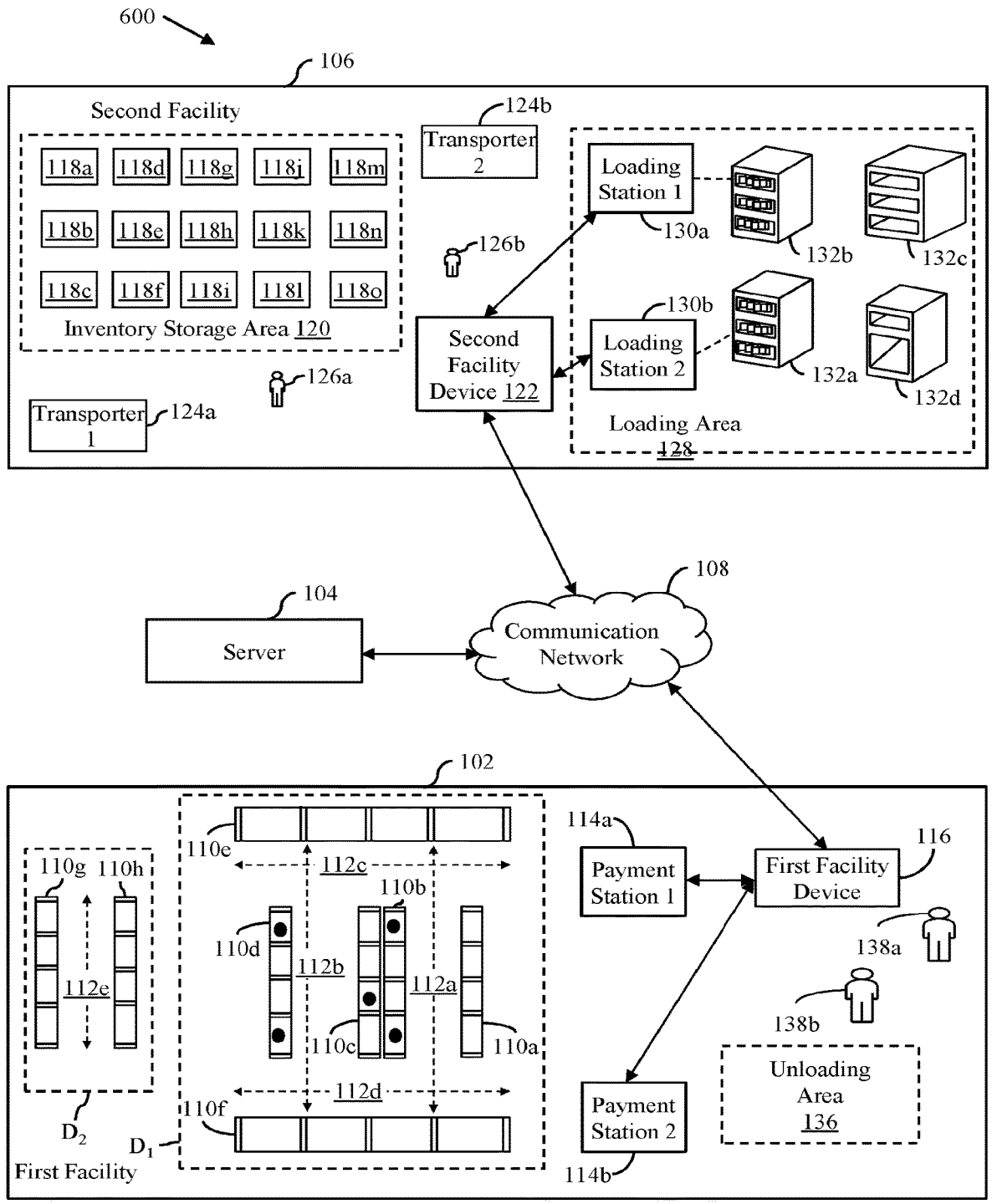
FIGS. 6A, 6B, and 6C are block diagrams that collectively illustrate an exemplary scenario for fulfilling inventory items in the first facility, in accordance with an embodiment of the present disclosure.
Figure 6B:
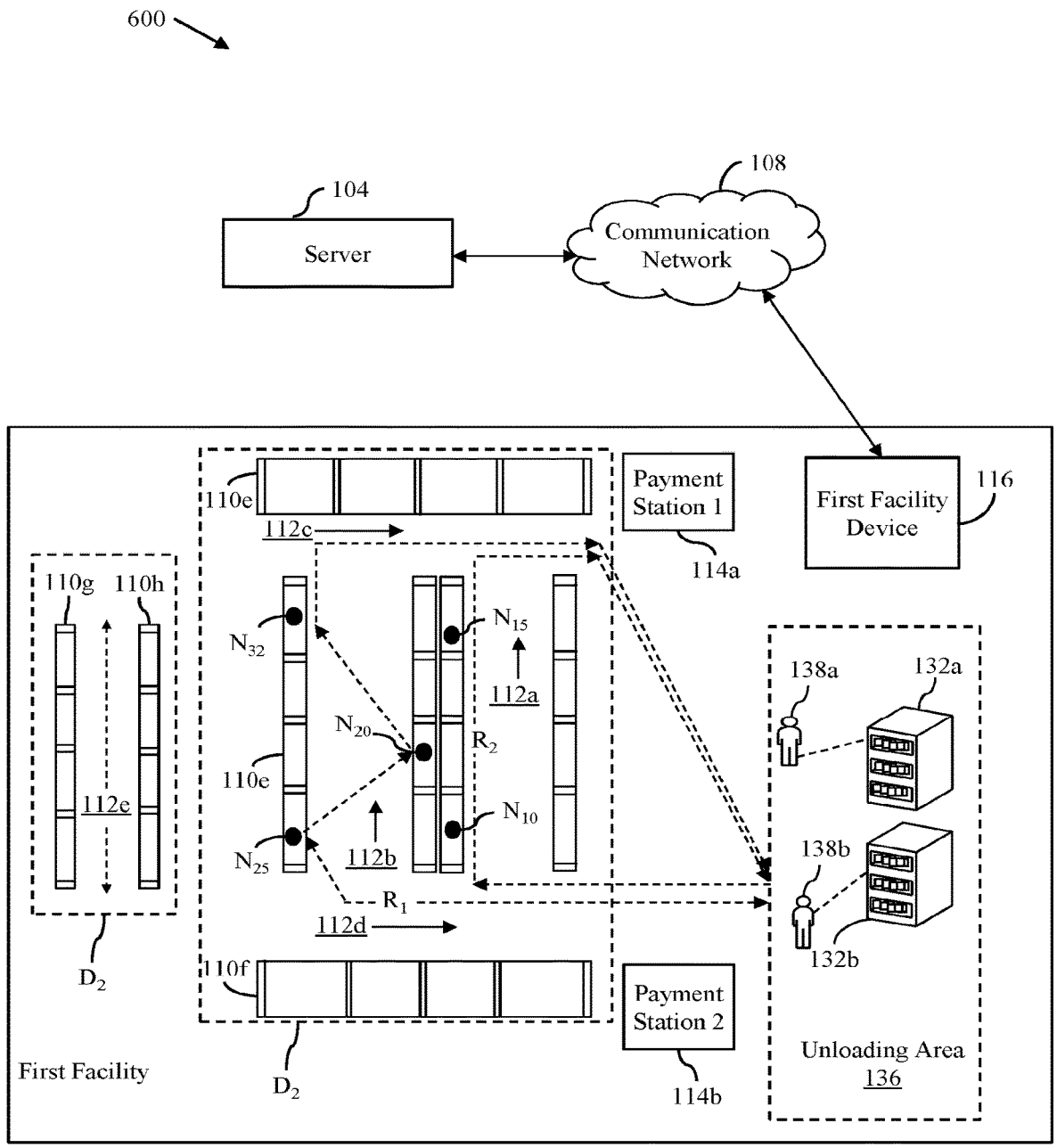
Figure 6C:
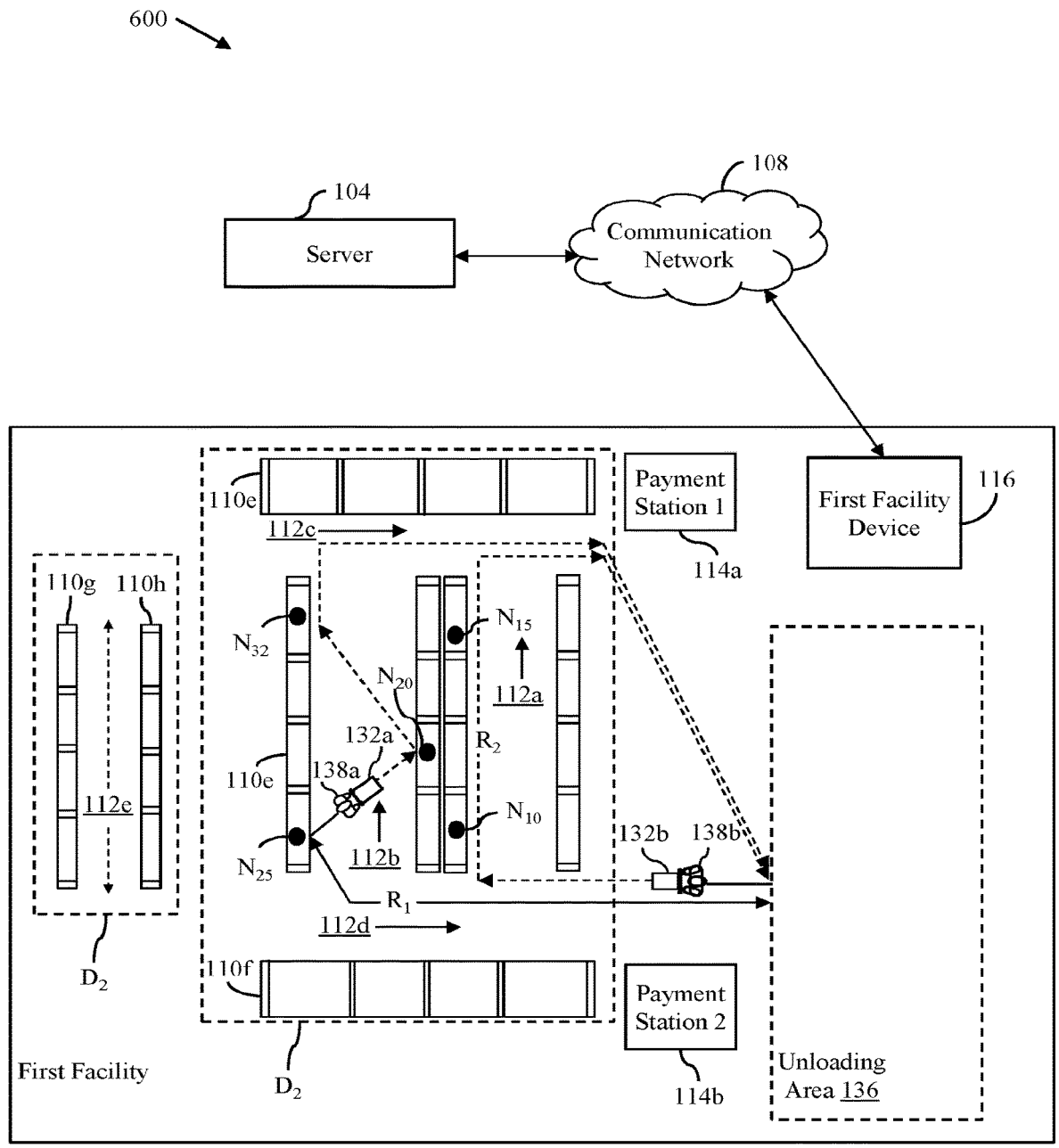

FIGS. 6A, 6B, and 6C are block diagrams that collectively illustrate an exemplary scenario 600 for fulfilling the inventory items in the first facility 102, in accordance with an embodiment of the present disclosure. FIGS. 6A, 6B, and 6C are described in conjunction with FIGS. 1, 2, and 3.

With reference to FIG. 6A, the second facility device 122 receives the first request and the packing instructions from the inventory management server 104. Based on the first request, the second facility device 122 provides the location co-ordinates and the rack identifiers of the first and second storage racks 118a and 118b storing the items A and B, respectively, to the first transporter 124a and instructs the first transporter 124a to transport the first and second storage racks 118a and 118b from the inventory storage area 120 to the first loading station 130a. The second facility device 122 further provides the location co-ordinates and the rack identifiers of the third, eighth, and tenth storage racks 118c, 118h, and 118j storing the items C, D, and E, respectively, to the second transporter 124b and instructs the second transporter 124b to transport the third, eighth, and tenth storage racks 118c, 118h, and 118j from the inventory storage area 120 to the second loading station 130b. In one embodiment, the inventory management server 104 may further optimize the pick-up of the storage racks 118 from the inventory storage area 120 by utilizing one or more techniques known in the art.

Based on the instructions from the second facility device 122, the first and second transporters 124a and 124b transport the corresponding storage racks to the first and second loading stations 130a and 130b, respectively. At the first loading station 130a, 200 units of oranges (i.e., the item A) are loaded and packed into the fourth bin 134d and 300 units of melons (i.e., the item B) are loaded and packed into the fifth and sixth bins 134e and 134f, of the second transport unit 132b. Likewise, at the second loading station 130b, 200 units of tomatoes (i.e., the item C) are loaded and packed into the first bin 134a, 250 units of onions (i.e., the item E) are loaded and packed into the second bin 134b, and 150 units of pumpkins (i.e., the item D) are loaded and packed into the third bin 134c, of the first transport unit 132a. In one embodiment, the first and second agents 126a and 126b manually load and pack the first and second transport units 132a and 132b with the corresponding inventory items based on the packing instructions. In another embodiment, the first and second transport units 132a and 132b are automatically loaded with the corresponding inventory items without any human intervention. FIG. 6A illustrates the loaded first and second transport units 132a and 132b that are ready to be shipped to the first facility 102. The second facility 106 may have a transfer vehicle, such as a truck, to ship the loaded first and second transport units 132a and 132b to the first facility 102. In one embodiment, the shipments of multiple retail facilities may be transported by using a single transport vehicle without deviating from the scope of the disclosure. In this scenario, the shipment loading into the transport vehicle is based on a last-in-first-out approach and the inventory management server 104 may identify another optimal route for the transport vehicle to cater to the multiple retail facilities.

With reference to FIG. 6B, the loaded first and second transport units 132a and 132b are unloaded from the transfer vehicle in the unloading area 136 by the first and second operators 138a and 138b. The inventory management server 104 communicates navigation details of the first and second optimal routes $R_1$ and $R_2$ to the operator devices of the first and second operators 138a and 138b, respectively. In one embodiment, the inventory management server 104 may directly communicate the navigation details of the first and second optimal routes $R_1$ and $R_2$ to the operator devices of the first and second operators 138a and 138b, respectively. In another embodiment, the inventory management server 104 may communicate the navigation details of the first and second optimal routes $R_1$ and $R_2$ to the operator devices of the first and second operators 138a and 138b, respectively, by way of the first facility device 116. In one embodiment, the inventory management server 104 may allocate the optimal routes to the first and second operators 138a and 138b based on various parameters, such as distances of the optimal routes and weights of the loaded transport units 132, to optimize the workload of the first and second operators 138a and 138b.

With reference to FIG. 6C, the first and second operators 138a and 138b use the navigation details received from the inventory management server 104 to fulfill the fulfillment nodes $N_{10}$, $N_{15}$, $N_{20}$, $N_{25}$, and $N_{32}$. Based on the navigation details of the first optimal route $R_1$, the first operator 138a traverses along the first optimal route $R_1$ with the first transport unit 132a and fulfills the fulfillment nodes $N_{25}$, $N_{20}$, and $N_{32}$ one after the other. The solid line of the first optimal route $R_1$ (as shown in FIG. 6C) indicates a part of the first optimal route $R_1$ that is already traversed by the first operator 138a and the dashed line of the first optimal route $R_1$ indicates a part of the first optimal route $R_1$ that is yet to be traversed by the first operator 138a. Thus, the first operator 138a has already fulfilled the node $N_{25}$ with 150 units of pumpkins. Likewise, the second operator 138b moves along the second optimal route $R_2$ with the second transport unit 132b, based on the navigation details of the second optimal route $R_2$, to fulfill the fulfillment nodes $N_{10}$ and $N_{15}$.

Figure 7:
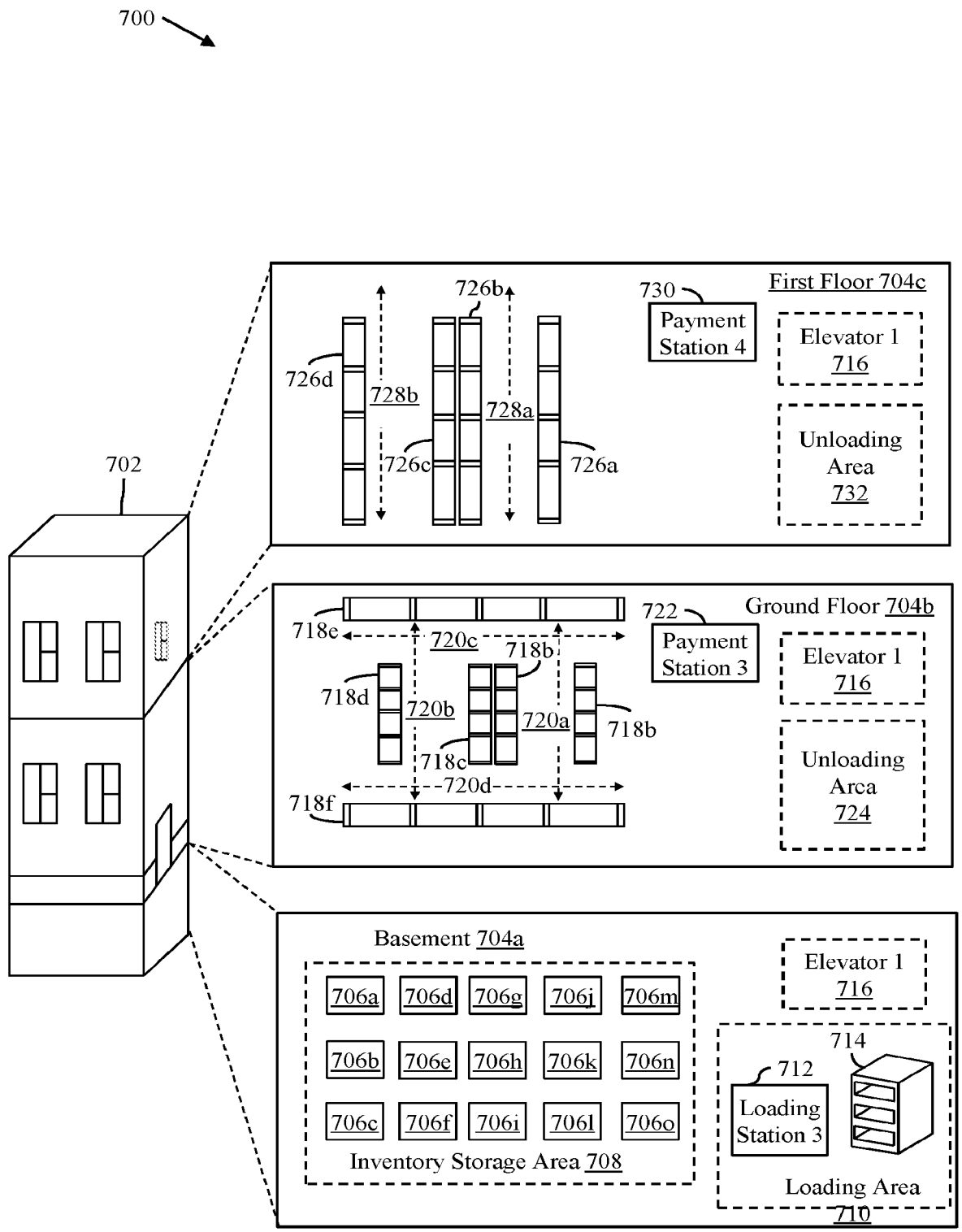
FIG. 7 is a block diagram that illustrates an exemplary multistory building including a warehouse and a retail facility in which various embodiment of the present disclosure are practiced.

FIG. 7 is a block diagram that illustrates an exemplary first multistory building 702 including a warehouse and a retail facility in which various embodiment of the present disclosure are practiced. The first multistory building 702 includes three floors, i.e., a basement 704a, a ground floor 704b, and a first floor 704c. The basement 704a is a warehouse (hereinafter, the basement 704a is referred to as "the warehouse 704a"). The ground floor 704b and the first floor 704c are two departments, such as a fresh produce department and apparels department, of the retail facility. Hereinafter, the ground floor 704b and the first floor 704c are referred to as "the fresh produce department 704b" and "the apparels department 704c", respectively.

The warehouse 704a stores various inventory items in bulk quantities to cater to fulfillment request of the fresh produce department 704b and the apparels department 704c. The inventory items in the warehouse 704a are organized and stored in storage racks 706a-706o placed in an inventory storage area 708 of the warehouse 704a. Each storage rack 706 is capable of being carried, rolled, otherwise moved. The warehouse 704a includes a loading area 710 having a third loading station 712 for loading and packing the inventory items in bins of transport units, such as a fifth transport unit 714, available at the warehouse 704a based on the packing instructions received from the inventory management server 104 as described in FIG. 3. The warehouse 704a further includes a first elevator 716 connecting the warehouse 704a to the fresh produce department 704b and the apparels department 704c. Upon completion of the packing, the loaded transport units, such as the fifth transport unit 714, are transported to the fresh produce department 704b and the apparels department 704c by using the first elevator 716 for fulfillment of the fresh produce department 704b and the apparels department 704c.

It will be apparent to a person having ordinary skill in the art that the inventory management server 104 manages the loading and packing of the fifth transport unit 714 based on the fulfillment requests of the fresh produce department 704b and the apparels department 704c in a manner similar to the loading and packing of the first and second transport units 132a and 132b as described in FIGS. 3 and 6A. Further, the warehouse 704a may have transporters similar to the first and second transporters 124a and 124b for moving the storage racks 706 to the loading area 710.

The fresh produce department 704b offers the sale of freshly produced items, such as vegetables, fruits, and the like. The freshly produced items are grouped and stored at various shelves (e.g., nodes) of display racks 718a-718f. The display racks 718a-718f are arranged such that aisles 720a-720d are formed therebetween. The fresh produce department 704b further includes a third payment station 722 where the customers pay for purchasing the freshly produced items and an unloading area 724. The loaded transport units, such as the fifth transport unit 714, from the warehouse 704a are received at the fresh produce department 704b by way of the first elevator 716 and transported to the unloading area 724. From the unloading area 724, the loaded transported units are moved by operators or AGVs of the fresh produce department 704b along the optimal routes identified by the inventory management server 104 for fulfilling the fulfillment nodes of the fresh produce department 704b.

The apparels department 704c offers the sale of clothing items that are stored at various shelves (e.g., nodes) of display racks 726a-726d. The display racks 726a-726d are arranged such that aisles 728a and 728b are formed therebetween. The apparels department 704c further includes a fourth payment station 730 where the customers pay for purchasing the clothing items and an unloading area 732. The loaded transport units from the warehouse 704a are received at the apparels department 704c by way of the first elevator 716 and transported to the unloading area 732. From the unloading area 732, the loaded transported units are moved along the optimal routes identified by the inventory management server 104 for fulfilling the fulfillment nodes of the apparels department 704c. The fulfillment of the fresh produce and apparels departments 704b and 704c is similar to the fulfillment of the first facility 102 as described on FIGS. 3, 6B, and 6C.

Figure 8:
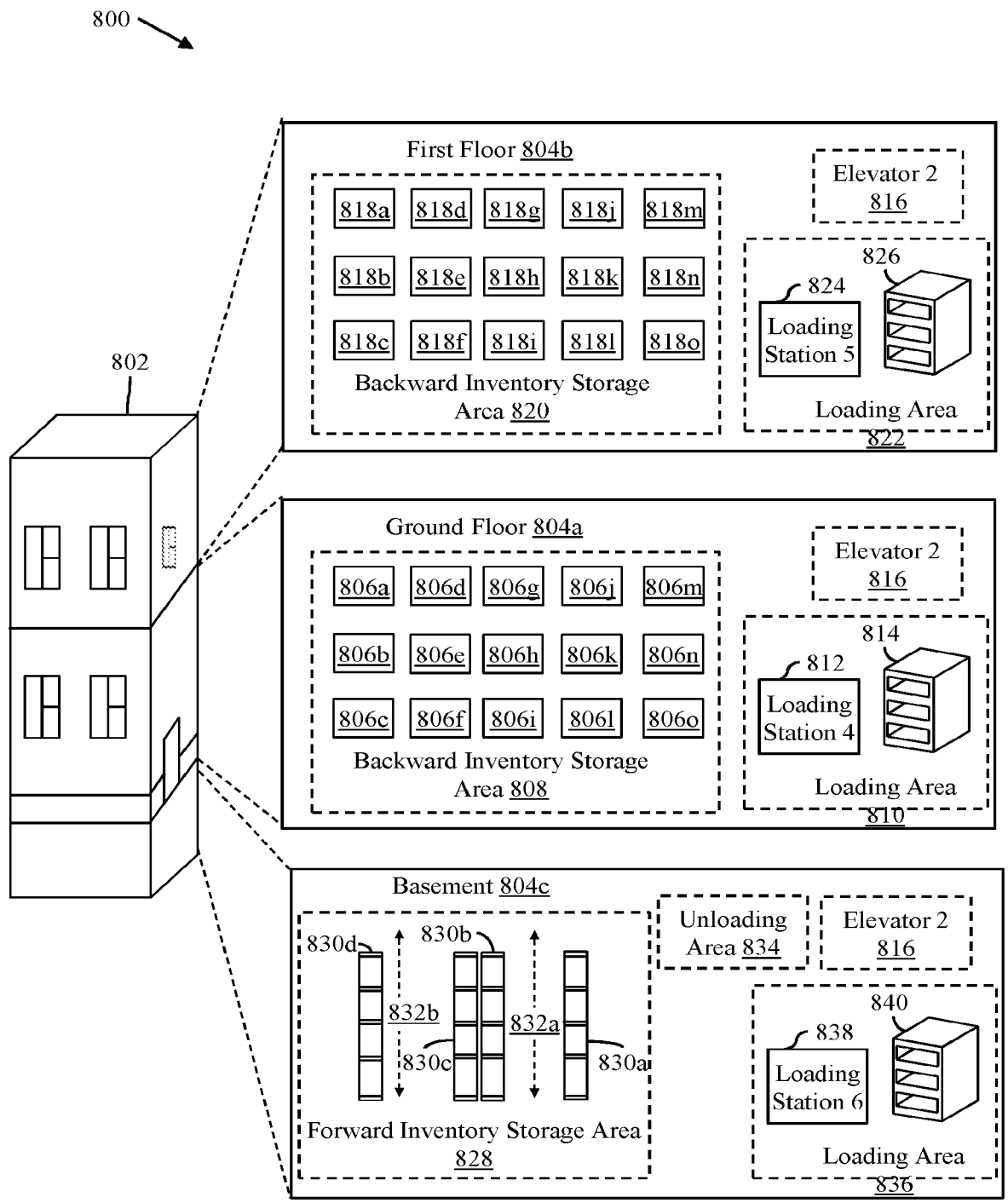
FIG. 8 is a block diagram that illustrates another exemplary multistory building including backward and forward warehouses in which various embodiment of the present disclosure are practiced.

FIG. 8 is a block diagram that illustrates an exemplary second multistory building 802 including a forward warehouse and a backward warehouse in which various embodiments of the present disclosure are practiced. The second multistory building 802 includes three floors, i.e., a ground floor 804a, a first floor 804b, and a basement 804c. The ground and first floors 804a and 804b constitute the backward warehouse, and the basement 804c is the forward warehouse 804c. In one embodiment, the forward warehouse 804c is the second facility 106.

The ground and first floors 804a and 804b store various inventory items in bulk quantities to cater to fulfillment request of the forward warehouse 804c. The inventory items on the ground floor 804a are stored in storage racks 806a-806o placed in a first backward inventory storage area 808. The ground floor 804a includes a loading area 810 having a fourth loading station 812 for loading and packing inventory items in bins of transport units, such as a sixth transport unit 814, available at the ground floor 804a based on the packing instructions from the inventory management server 104 as described in FIG. 3. The ground floor 804a further includes a second elevator 816 connecting the ground floor 804a to the first floor 804b and the forward warehouse 804c. Upon completion of the packing, the loaded transport units, such as the sixth transport unit 814, are transported to the forward warehouse 804c by using the second elevator 816 for fulfillment of the forward warehouse 804c. Likewise, the inventory items on the first floor 804b are organized and stored in storage racks 818a-818o placed in a second backward inventory storage area 820. The first floor 804b includes another loading area 822 having a fifth loading station 824 for loading and packing inventory items in bins of transport units, such as a seventh transport unit 826, available at the first floor 804b based on the packing instructions from the inventory management server 104 as described in FIG. 3. The first floor 804b further includes the second elevator 816 for transporting the loaded seventh transport unit 826 to the forward warehouse 804c to fulfill the forward warehouse 804c. Further, the ground and first floors 804a and 804b may have transporters similar to the first and second transporters 124a and 124b for moving the storage racks 806 and 818 to the loading areas 810 and 822.

The forward warehouse 804c stores the inventory items for catering to the fulfillment requests of various retail facilities, such as the first facility 102. The inventory items are stored in a forward inventory storage area 828 at various shelves (e.g., nodes) of storage racks 830a-830d. The storage racks 830a-830d are arranged such that aisles 832a and 832b are formed therebetween. The forward warehouse 804c further includes an unloading area 834. The loaded transport units from the ground and first floors 804a and 804b are received at the forward warehouse 804c by way of the second elevator 816 and transported to the unloading area 834. From the unloading area 834, the loaded transported units are moved by agents or AGVs of the forward warehouse 804c along the optimal routes identified by the inventory management server 104 for fulfilling the fulfillment nodes of the forward warehouse 804c. The fulfillment of the forward warehouse 804c is similar to the fulfillment of the first facility 102 as described on FIGS. 3, 6B, and 6C. The forward warehouse 804c further includes a loading area 836 having a sixth loading station 838 for loading and packing inventory items in bins of transport units, such as an eighth transport unit 840, available at the forward warehouse 804c to cater to the fulfillment requests of various retail facilities based on the packing instructions from the inventory management server 104 as described in FIG. 3.

It will be apparent to a person having ordinary skill in the art that the first and second multistory buildings 702 and 802 are shown for exemplary purposes and should not be construed to limit the scope of the disclosure. In another embodiment, the first multistory building 702 may be a manufacturing industry where loaded and packed transport units from the warehouse 704a are transported to the ground and first floors 704b and 704c for fulfillment of raw materials and components without deviating from the scope of the disclosure.

FIG. 9 is a block diagram that illustrates the inventory management server 104, in accordance with an embodiment of the present disclosure. The inventory management server 104 includes a processor 902, a database 904 (as described in FIG. 3), and a transceiver 906 that communicate with each other by way of a first communication bus 908. The processor 902 includes an inventory manager 910, a request handler 912, a layout manager 914, a route identifier 916, and an allocation manager 918 that communicate with each other by way of a second communication bus 920. It will be apparent to a person having ordinary skill in the art that the inventory management server 104 is for illustrative purposes and not limited to any specific combination or hardware circuitry and/or software. For example, the server 104 may be implemented by a server system that includes a plurality of servers each configured to perform one or a combination of the functions of the server.

The processor 902 includes suitable logic, circuitry, and/or interfaces to execute various operations, such as the inventory management operations, the warehouse management operations, procurement operations, and the like. Examples of the processor 902 include, but are not limited to, an application-specific integrated circuit (ASIC) processor, a reduced instruction set computing (RISC) processor, a complex instruction set computing (CISC) processor, a field-programmable gate array (FPGA), and the like. The processor 902 performs the inventory management operations, such as identifying the optimal routes and determining the packing instructions (as described in foregoing in FIG. 3), to facilitate fulfillment of the inventory items in various retail facilities, such as the first facility 102.

The database 904 includes suitable logic, circuitry, and/or interfaces to store an inventory list 922, layout information 924, inventory storage data 926, transport unit data 928, and operator information 930 (as described in FIG. 3). Examples of the database 904 include a random-access memory (RAM), a read-only memory (ROM), a removable storage drive, a hard disk drive (I-IDD), a flash memory, a solid-state memory, and the like. In one embodiment, the database 904 may be realized through various database technologies such as, but not limited to, Microsoft® SQL, Oracle®, IBM DB2®, Microsoft Access®, PostgreSQL®, MySQL® and SQLite®. It will be apparent to a person skilled in the art that the scope of the disclosure is not limited to realizing the database 904 in the inventory management server 104, as described herein. In other embodiments, the database 904 may be realized in form of an external database server or a cloud storage working in conjunction with the inventory management server 104, without departing from the scope of the disclosure.

The inventory list 922 includes the list of inventory items stored in the second facility 106 and the number of units of each inventory item stored in the second facility 106. The layout information 924 includes information of the layout of the first facility 102 such as the location data of the food and apparels departments $D_1$ and $D_2$ and the aisles 112, and the location data of the nodes N (as described in FIG. 3). The layout information 924 further includes the association between the aisles 112 and the nodes N, and the association between the nodes N and the inventory items, respectively. The layout information 924 further includes the real-time path availability information of various paths in the first facility 102. For example, a first path in the first facility 102 may be under maintenance and hence is unavailable for traversing.

The inventory storage data 926 is indicative of storage locations of the storage racks 118 in the second facility 106 and the inventory items on the storage racks 118. The inventory storage data 926 further includes the rack identifiers of the storage racks 118. The rack identifiers are unique codes assigned to each of the storage racks 118. In one example, the rack identifiers are radio frequency identification (RFID) tags that are readable by the first and second transporters 124a and 124b. Thus, based on the inventory storage data 926, the inventory management server 104 is aware of the locations of all inventory items stored in the second facility 106. In one embodiment, the inventory management server 104 communicates the location coordinates and the rack identifiers of the storage racks storing the items A, B, C, D, and E to the second facility device 122 along with the packing instructions. The transport unit data 928 is indicative of details of the first through fourth transport units 132a-132d available in the second facility 106. The details of the first through fourth transport units 132a-132d include capacity, size, and dimension of each transport unit 132a-132d and the corresponding bins. The operator information 930 includes details of various operators, such as the first and second operators 138a and 138b, working in the first facility 102. The details may include name, gender, age, demographic details, and the like. In one embodiment, the inventory list 922, the inventory storage data 926, and the transport unit data 928 are stored by a warehouse management server of the second facility 106 in the database 904. In one scenario, the second facility device 122 may serve as the warehouse management server.

The transceiver 906 transmits and receives data over the communication network 108 using one or more communication network protocols. The transceiver 906 transmits various requests and messages to the first and second facility devices 116 and 122 and receives requests and messages from the first and second facility devices 116 and 122. Examples of the transceiver 906 include, but are not limited to, an antenna, a radio frequency transceiver, a wireless transceiver, a Bluetooth transceiver, an ethernet based transceiver, a universal serial bus (USB) transceiver, or any other device configured to transmit and receive data.

The processor 902 performs the inventory management operations by way of the inventory manager 910, the request handler 912, the layout manager 914, the route identifier 916, and the allocation manager 918. The inventory manager 910 manages the inventory list 922 stored in the database 904. For example, the inventory manager 910 adds new inventory items to the inventory list 922 when the new inventory items are stored in the second facility 106 and updates the inventory list 922 based on the fulfillment of the first requests of the first facility 102.

The request handler 912 processes all first requests received from the retail facilities, such as the first facility 102. In one embodiment, when the second facility 106 does not have all inventory items specified in the first request from the first facility 102, the request handler 912 may queue the first request for a specific-time interval until the second facility 106 procures all the inventory items specified in the first request. In another embodiment, when the second facility 106 does not have all the inventory items specified in the first request, the request handler 912 declines the first request and informs the first facility device 116. In another embodiment, when the second facility 106 does not have all the inventory items specified in the first request, the request handler 912 processes the one or more requested inventory items for which the requested quantity is available and queues the one or more items of insufficient quantity for a specific-time interval until the second facility 106 procures a sufficient quantity of those one or more items. In one embodiment, the request handler 912 merges the first requests of the first and second departments $D_1$ and $D_2$ to optimize the shipment. In another embodiment, the request handler 912 merges various first requests of the first facility 102 that are received within the first-time interval for optimizing the shipment.

The layout manager 914 manages the layout information 924. For example, if there is any change in the layout of the first facility 102 (such as a change in the arrangement of the display racks 110), the layout manager 914 updates the layout information 924 based on the change in the layout. The route identifier 916 is responsible for identifying the optimal routes. Thus, the route identifier 916 performs all operation involved in the identification of the optimal routes, such as determining the distance saving factors, identifying the intermediate routes, and merging the intermediate routes (as described in FIG. 3). The allocation manager 918 handles the allocation of the transport units 132 and performs the bin mapping operation for the allocated transport units 132 (as described in FIG. 3).

Though, the processor 902 is depicted as a hardware component in FIG. 9, a person skilled in the art will appreciate that the scope of the disclosure is not limited to realizing the processor 902 as the hardware component. In another embodiment, the functionality of the processor 902 may be implemented by way of a computer executable code or a set of computer readable instructions stored in the database 904, without deviating from the spirit of the disclosure.

FIG. 10 is a block diagram that illustrates an operator device 1002 of the first operator 138a, in accordance with an embodiment of the present disclosure. It will be apparent to a person skilled in the art that the operator device of the second operator 138b is functionally similar to the operator device 1002. The operator device 1002 can be a portable device (e.g., a tablet, smartphone, laptop, or other handheld device). In another embodiment, the operator device 1002 can be attached or otherwise integrated into a transport unit. Further, in some embodiments, the operator device 1002 is temporarily attached, for example via a dock, to the transport unit.

The operator device 1002 may communicate with the first facility device 116 by means of various wired communication protocols (such as a fiber optic network, a coaxial cable network, and the like) and wireless communication protocols (such as Wi-Fi, Bluetooth, Infrared, and the like). The operator device 1002 receives the navigation details of the first optimal route $R_1$ communicated by the inventory management server 104 and renders a graphical user interface (GUI) 1004 on a corresponding display to present the navigation details to the first operator 138a. In other words, the GUI 1004 displays the navigation details and guides the first operator 138a to move along the first optimal route $R_1$. For example, when the first operator 138a is traversing along the first optimal route $R_1$ and has reached at location $L_1$, the GUI 1004 prompts the first operator 138a to take a right turn from the location $L_1$ to reach the fulfillment node $N_{25}$. The GUI 1004 may prompt the first operator 138a by providing audio-visual navigation instructions to the first operator 138a. The navigation details further include information pertaining to a rack level of the fulfillment nodes $N_{20}$, $N_{25}$, and $N_{32}$. For example, the fulfillment nodes $N_{20}$ and $N_{32}$ are at ground levels of the third and fourth display racks 110c and 110d, respectively, and the fulfillment node $N_{25}$ is at a first level of the fourth display rack 110d. When the first operator 138a reaches in front a fulfillment node, the GUI 1004 further instructs the first operator 138a to pick-up all units of the inventory item corresponding to the fulfillment node and place them in the fulfillment node. For example, when the first operator 138a reaches in front of the fulfillment node $N_{25}$ with the first transport unit 132a, the GUI 1004 provides audio-visual instructions to the first operator 138a to pick-up 150 units of pumpkins from the third bin 134c of the first transport unit 132a and place them in the fulfillment node $N_{25}$.

In one embodiment, the operator device 1002 may be installed with a navigation module, such as global positioning system (GPS) or Wi-Fi based positioning system, that tracks a real-time location of the first operator 138a. The operator device 1002 may further communicate the real-time location of the first operator 138a to the first facility device 116 or the inventory management server 104, thereby enabling the first facility device 116 and the inventory management server 104 to track the movement of the first operator 138a along the first optimal route $R_1$ in real-time.

In one embodiment, the operator device 1002 may be installed with a scanning module, such as a bar code scanner, a camera, or an RFID reader, that is capable of scanning rack identifiers (such as barcodes or RFID tags) of the display racks 110. Thus, when the first operator 138a moves along the first optimal route $R_1$, the scanning module continues to scan the rack identifiers corresponding to the fulfillment nodes that are fulfilled by the first operator 138a while moving along the first optimal route $R_1$ and the operator device 1002 communicates the information pertaining to the fulfillment nodes that are fulfilled to the inventory management server 104. Based on the information received from the operator device 1002, the inventory management server 104 determines what part of the first optimal route $R_1$ is pending to be traversed by the first operator 138a, and what part of the first optimal route $R_1$ is already traversed by the first operator 138a and is free to be traversed by any other operator for fulfillment. For example, when the first operator 138a is at location $L_2$, the inventory management server 104 determines that path between the unloading area 136 and the location $L_2$ is already traversed by the first operator 138a and is free to be traversed by any other operator for fulfillment. The inventory management server 104 may use this information to schedule the traversing of the optimal routes by the first and second operators 138a and 138b.

In one embodiment, when the AGVs are used in the first facility 102 for fulfilling the fulfillment nodes $N_{10}$, $N_{15}$, $N_{20}$, $N_{25}$, and $N_{32}$, the operator device 1002 may be installed in the AGVs for receiving the information of the first and second optimal routes $R_1$ and $R_2$ from the inventory management server 104, thereby providing real-time navigation guidance to the AGVs.

Figure 11:
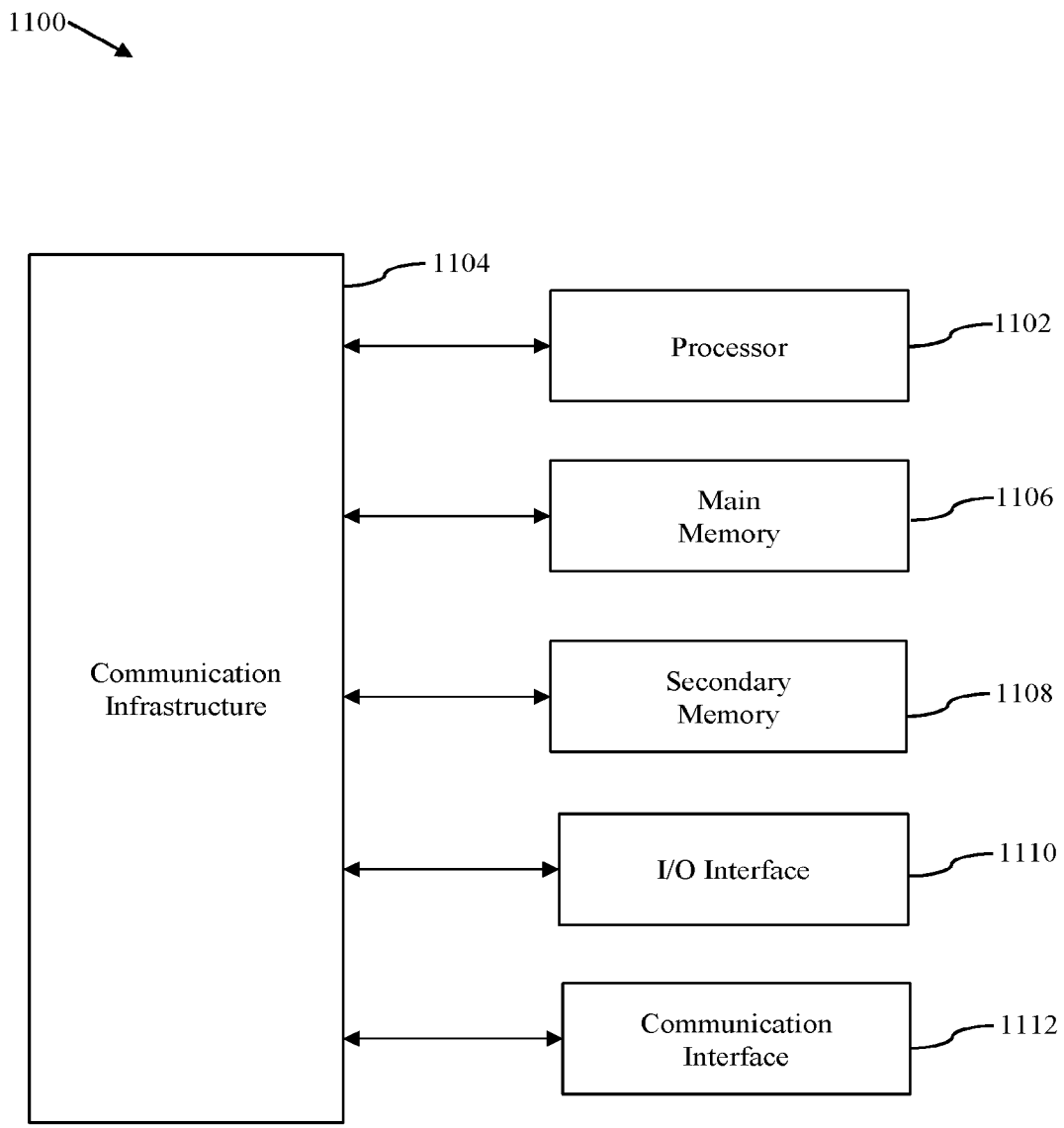
FIG. 11 is a block diagram that illustrates system architecture of a computer system, in accordance with an embodiment of the present disclosure.

FIG. 11 is a block diagram that illustrates system architecture of a computer system 1100, in accordance with an embodiment of the present disclosure. An embodiment of present disclosure, or portions thereof, may be implemented as computer readable code on the computer system 1100. In one example, the first and second facility devices 116 and 122, the operator devices, and the billing devices may be implemented in the computer system 1100. Hardware, software, or any combination thereof may embody modules and components used to implement methods of FIGS. 12 and 13. The computer system 1100 includes a processor 1102 that may be connected to a communication infrastructure 1104. The computer system 1100 may further include a main memory 1106 and a secondary memory 1108. The computer system 1100 further includes an input/output (I/O) interface 1110 and a communication interface 1112. The communication interface 1112 may allow data transfer between the computer system 1100 and various devices that are communicatively coupled to the computer system 1100.

Figure 12:
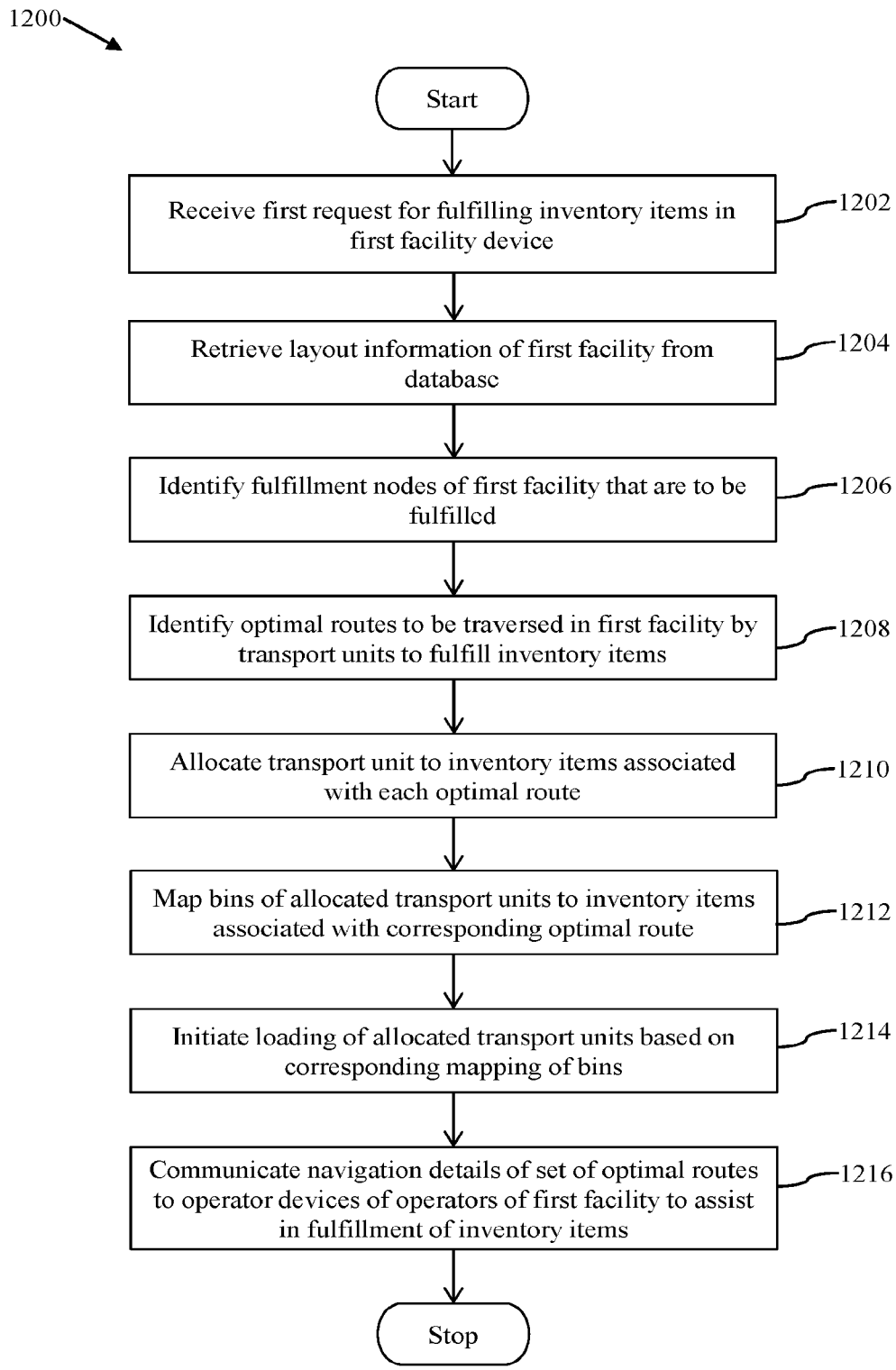
FIG. 12 is a flow chart that illustrates a method for fulfilling inventory items in the first facility, in accordance with an embodiment of the present disclosure.

FIG. 12 is a flow chart 1200 that illustrates the method for fulfilling the inventory items in the first facility 102, in accordance with an embodiment of the present disclosure. FIG. 12 is explained in conjunction with FIGS. 1, 2, 3, 4, 5, 6A, 6B, and 6C, as an example.

At step 1202, the inventory management server 104 receives the first request for fulfilling the inventory items from the first facility device 116. The first request is indicative, for example, of the number of units of the items A, B, C, D, and E that are to be fulfilled in the first facility 102. At step 1204, the inventory management server 104 retrieves the layout information 924 of the first facility 102 from the database 904. At step 1206, the inventory management server 104 identifies fulfillment nodes of the first facility 102 that are to be fulfilled based on the first request and the layout information 924. For example, as described in FIG. 3, the fulfillment nodes $N_{10}$, $N_{15}$, $N_{20}$, $N_{25}$, and $N_{32}$ are identified by the inventory management server 104 for fulfillment. At step 1208, the inventory management server 104 identifies the optimal routes (such as the first and second optimal routes $R_1$ and $R_2$) to be traversed by the transport units 132 in the first facility 102 for fulfilling the items A, B, C, D, and E at the corresponding fulfillment nodes. The method for the identification of the optimal routes is described later in conjunction with FIG. 13, for example.

At step 1210, the inventory management server 104 allocates a transport unit of the transport units 132 to the inventory items of each optimal route. The allocation of the transport units 132 is based on, for example, the volumetric requirement of each optimal route $R_1$ and $R_2$, and/or the capacities of the transport units 132. For example, as described in FIG. 3, the inventory management server 104 allocates the first transport unit 132a to the items C, D, and E associated with the first optimal route $R_1$ and the second transport unit 132b to the items A and B associated with the second optimal route $R_2$.

At step 1212, the inventory management server 104 maps the bins of the allocated transport units 132a and 132b to the inventory items associated with the corresponding optimal route. For example, as described in FIG. 3, the first through third bins 134a-134c of the first transport unit 132a are mapped to the items C, E, and D, respectively, and the fourth through sixth bins 134d-134f are mapped to the items A, B, and B, respectively. The bin mapping is based on, for example, the centers of gravity of the allocated transport units 132a and 132b, the dimensions of the allocated transport units 132a and 132b, the capacities of the first through sixth bins 134a-134f of the allocated transport units 132a and 132b, fragility of the items A, B, C, D, and E, and/or weights of the items A, B, C, D, and E.

At step 1214, the inventory management server 104 initiates the loading of the one or more allocated transport units. For example, the inventory management server 104 initiates the loading of the allocated transport units 132a and 132b based on the mapping of the bins (such as the first through sixth bins 134a-134f), such that each bin is loaded with the corresponding mapped inventory item. For initiating the loading of the allocated transport units 132a and 132b, for example, the inventory management server 104 communicates the first request and the packing instructions to the second facility device 122 as described in FIG. 6A. The loading of the allocated transport units 132a and 132b is explained in the foregoing in FIG. 6A.

At step 1216, the inventory management server 104 communicates the navigation details of the optimal routes to the operator devices (such as the operator device 1002) of the first and second operators 138a and 138b to assist in the fulfillment of the inventory items (such as the items A, B, C, D, and E) at the corresponding fulfillment nodes in the first facility 102.

Figure 13:
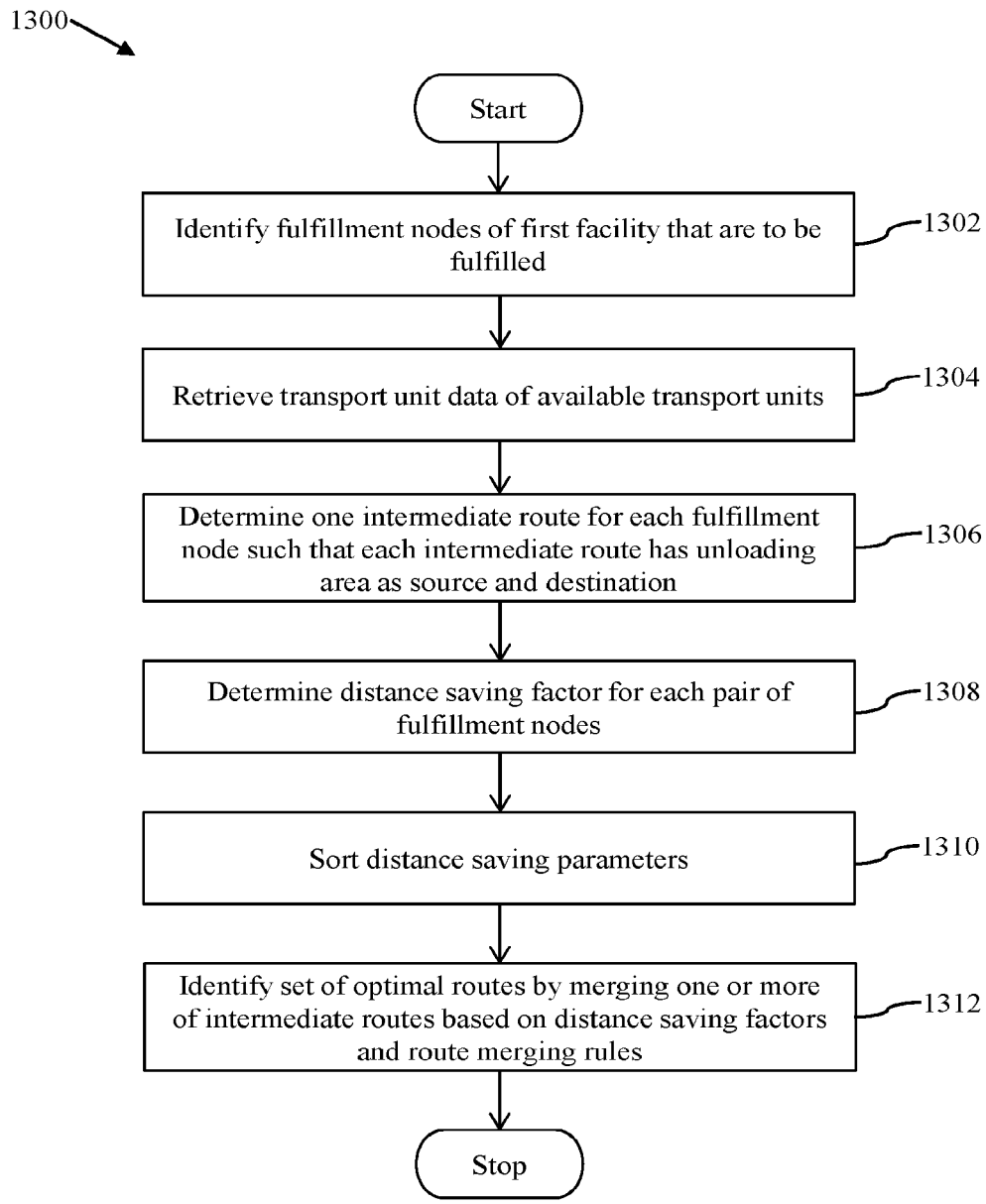
FIG. 13 is a flow chart that illustrates a method for identifying optimal routes within the first facility, in accordance with an embodiment of the present disclosure.

FIG. 13 is a flow chart 1300 that illustrates the method for identifying the optimal routes, such as the first and second optimal routes $R_1$ and $R_2$, within the first facility 102, in accordance with an embodiment of the present disclosure. FIG. 13 is explained in conjunction with FIGS. 1, 2, and 3, as an example. The inventory management server 104 receives, for example, the first request from the first facility device 116 for fulfilling the items A, B, C, D, and E (as described in FIG. 3).

At step 1302, the inventory management server 104 identifies the one or more fulfillment nodes of the first facility 102 that are to be fulfilled based on the first request and the layout information 924. As described in FIG. 3, for example, the fulfillment nodes $N_{10}$, $N_{15}$, $N_{20}$, $N_{25}$, and $N_{32}$ are identified by the inventory management server 104. At step 1304, the inventory management server 104 retrieves the transport unit data 928 of the transport units 132 available in the second facility 106 from the database 904. At step 1306, the inventory management server 104 determines one intermediate route for each fulfillment node, for example the fulfillment nodes $N_{10}$, $N_{15}$, $N_{20}$, $N_{25}$, and $N_{32}$ such that each intermediate route has the unloading area 136 as the source and destination. Table 400 depicts the intermediate routes identified by the inventory management server 104.

At step 1308, the inventory management server 104 determines the distance saving factor for each pair of fulfillment nodes, for example $N_{10}$, $N_{15}$, $N_{20}$, $N_{25}$, and $N_{32}$. At step 1310, the inventory management server 104 sorts the distance saving factors in one of descending order and ascending order. Table 500 depicts the distance saving factors for the fulfillment nodes $N_m$, $N_{is}$, $N_{20}$, $N_{25}$, and $N_{32}$ sorted in descending order by the inventory management server 104. At step 1312, the inventory management server 104 identifies the optimal routes by merging one or more intermediate routes based on the distance saving factors and the first through third route merging rules. Each optimal route caters to one or more of the fulfillment nodes for fulfillment of the corresponding items. For example, the first optimal route $R_1$ caters to the fulfillment nodes $N_{20}$, $N_{25}$, and $N_{32}$ for fulfilling the items C, D, and E at the fulfillment nodes $N_{20}$, $N_{25}$, and $N_{32}$, respectively. The identification of the optimal routes (such as the first and second optimal routes $R_1$ and $R_2$) is explained in detail in the foregoing in FIG. 3 as an example.

The inventory management server 104 uses the layout information 924 of the first facility 102 while determining an optimal packing sequence for the inventory items specified in the first request, thereby reducing unpacking and fulfillment time in the first facility 102. As the inventory management server 104 segregates and sorts the inventory items to be fulfilled as per the departments and the optimal routes, the time that was earlier consumed in segregation and sorting of the inventory items after the unloading of the shipment in the unloading area 136, is now saved. In other words, the inventory management server 104 uses a goods to person approach for catering to the fulfillment requests as the inventory items are packed and loaded based on the unpacking sequence in the first facility 102 and moved to the first and second operators 138a and 138b for fulfillment. In contrast to related fulfilling methods where the operators choose the route for fulfilling the inventory items, the method and system of the present disclosure includes the inventory management server 104 for identifying the optimal routes for fulfilling the inventory items in the first facility 102. For example, the inventory management server 104 communicates the navigation details of the optimal routes to the first and second operators 138a and 138b, which prevents repeated route traversal in the first facility 102 by the first and second operators 138a and 138b while fulfilling the items A, B, C, D, and E at the corresponding fulfillment nodes, which results in the reduction of the fulfillment time. In addition, workload of the first and second operators 138a and 138b is also balanced as the inventory management server 104 assigns the optimal routes to be traversed by each operator 138 in the first facility 102 for fulfilling the fulfillment nodes. As the transport unit data 928 of the transport units 132 is taken into account by the inventory management server 104 while determining the optimal packing sequence, maximum capacity utilization of the transport units 132 is achieved. The centers of gravity of the allocated transport units 132a and 132b is an important factor, among other factors like weight and fragility of the inventory items, that is taken into consideration by the inventory management server 104, while mapping the inventory items to the bins 134 of the allocated transport units 132a and 132b. Hence, maintaining the stability of the transport units 132 when loaded with the inventory items. The method and system of the present disclosure provides flexible and scalable solution that can be easily adapted to accommodate any change in retail facility and warehouse parameters, such as arrangement of the display racks 110, addition of new inventory items, and the like.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features, systems and methods for fulfilling inventory items in retail facilities. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method for fulfilling a plurality of inventory items in a first facility, the method comprising:
   receiving, by an inventory management server, a first request to fulfill the plurality of inventory items in the first facility, the plurality of inventory items being stored in a second facility before fulfillment;
   retrieving, by the inventory management server, layout information of the first facility from a database;
   identifying, by the inventory management server, a plurality of nodes in the first facility, at which the plurality of inventory items is to be fulfilled, based on the layout information;
   identifying, by the inventory management server, a first route to first and second nodes of the plurality of nodes at which first and second inventory items of the plurality of inventory items are to be fulfilled, respectively;
   allocating, by the inventory management server, the first and second inventory items to a first transport unit available at the second facility; and
   mapping, by the inventory management server, the first and second inventory items to first and second bins of the first transport unit, respectively, based on at least a sequence of the first and second nodes in the first route,
   wherein the first and second inventory items are loaded onto the first transport unit based on the mapping and transferred from the second facility to the first facility via the first transport unit and fulfilled at the first and second nodes, respectively, when the first transport unit traverses along the first route.

2. The method of claim 1, wherein the first request indicates a number of units of each of the plurality of inventory items that are to be fulfilled.

3. The method of claim 1, wherein the identifying the first route comprises:
   identifying the first route based on at least one of a capacity of the first transport unit, volumetric requirements of the first and second nodes, or a distance between the first and second nodes.

4. The method of claim 3, wherein the volumetric requirements of the first and second nodes are based on a number of units of each of the first and second inventory items that are to be fulfilled.

5. The method of claim 3, wherein the layout information includes location data of a plurality of aisles in the first facility, location data of the plurality of nodes, associations between the plurality of aisles and the plurality of nodes, associations between the plurality of nodes and the plurality of inventory items, and real-time path availability information of a plurality of paths in the first facility.

6. The method of claim 5, wherein:
   the location data of the plurality of aisles includes location coordinates of entry and exit points of the plurality of aisles, and
   the location data of the plurality of nodes includes location coordinates of the plurality of nodes.

7. The method of claim 6, wherein the distance between the first and second nodes is determined, by the inventory management server, using the location data of the aisles corresponding to the first and second nodes and the location data of the first and second nodes.

8. The method of claim 5, wherein the identifying the first route comprises:
   identifying the first route based on the real-time path availability information and the distance between the first and second nodes.

9. The method of claim 1,
   wherein the mapping is further based on at least one of a center of gravity of the first transport unit, dimensions of the first transport unit, capacities of the first and second bins, fragility of the first and second inventory items, or weights of the first and second inventory items.

10. The method of claim 1, wherein when the first node is before the second node in the sequence, the first bin of the first transport unit is located below the second bin of the first transport unit.

11. The method of claim 9, further comprising:
    initiating, by the inventory management server, loading of the first and second inventory items in the first and second bins, respectively, wherein
    the first and second inventory items are loaded in the first and second bins, respectively, by one or more agents of the second facility or automatically without manual intervention.

12. The method of claim 1, further comprising:
    communicating, by the inventory management server, navigation details of the first route to an operator device for presentation to an operator to move the first transport unit.

13. The method of claim 12, wherein the operator device receives the navigation details of the first route from the inventory management server and renders a user interface thereon, wherein the user interface displays the navigation details for guiding the operator to traverse along the first route with the first transport unit, for fulfilling the first and second nodes.

14. The method of claim 12, further comprising:
    receiving, by the inventory management server from the operator device, a real-time location of the operator when the operator is traversing along the first route for fulfilling the first and second nodes; and tracking, by the inventory management server, a movement of the operator along the first route in real-time based on the received real-time location of the operator.

15. A system for fulfilling a plurality of inventory items in a first facility, the system comprising:

a database configured to store layout information of the first facility; and an inventory management server configured to communicate with the database, wherein the inventory management server includes processing circuitry that is configured to:

receive a first request to fulfill the plurality of inventory items in the first facility, the plurality of inventory items being stored in a second facility before fulfillment, retrieve the layout information of the first facility from the database, identify a plurality of nodes in the first facility, at which the plurality of inventory items is to be fulfilled, based on the layout information, identify a first route to first and second nodes of the plurality of nodes at which first and second inventory items of the plurality of inventory items are to be fulfilled, respectively, map, by the inventory management server, the first and second inventory items to first and second bins of the first transport unit, respectively, based on at least a sequence of the first and second nodes in the first route, allocate the first and second inventory items to a first transport unit available at the second facility, wherein the first and second inventory items are loaded onto the first transport unit based on the map of the first and second inventory items to first and second bins of the first transport unit, respectively, and transferred from the second facility to the first facility via the first transport unit and fulfilled at the first and second nodes, respectively, when the first transport unit traverses along the first route.

16. The system of claim 15, wherein the first request indicates a number of units of each of the plurality of inventory items that are to be fulfilled.

17. The system of claim 15, wherein the processing circuitry is configured to identify the first route based on at least one of a capacity of the first transport unit, volumetric requirements of the first and second nodes, or a distance between the first and second nodes.

18. The system of claim 17, wherein the volumetric requirements of the first and second nodes are based on a number of units of each of the first and second inventory items that are to be fulfilled.

19. The system of claim 17, wherein the layout information includes location data of a plurality of aisles in the first facility, location data of the plurality of nodes, associations between the plurality of aisles and the plurality of nodes, associations between the plurality of nodes and the plurality of inventory items, and real-time path availability information of a plurality of paths in the first facility.

20. The system of claim 19, wherein:

the location data of the plurality of aisles includes location coordinates of entry and exit points of the plurality of aisles, and the location data of the plurality of nodes includes location coordinates of the plurality of nodes.

21. The system of claim 20, wherein the distance between the first and second nodes is determined, by the processing circuitry, using the location data of the aisles corresponding to the first and second nodes and the location data of the first and second nodes.

22. The system of claim 19, wherein the processing circuitry is configured to identify the first route based on the real-time path availability information and the distance between the first and second nodes.

23. The system of claim 15, wherein the processing circuitry is further configured to:

map the first and second inventory items based on at least one of a center of gravity of the first transport unit, dimensions of the first transport unit, capacities of the first and second bins, fragility of the first and second inventory items, or weights of the first and second inventory items.

24. The system of claim 15, wherein when the first node is before the second node in the sequence, the first bin of the first transport unit is located below the second bin of the first transport unit.

25. The system of claim 23, wherein the processing circuitry is further configured to:

initiate loading of the first and second inventory items in the first and second bins, respectively, wherein the first and second inventory items are loaded in the first and second bins, respectively, by one or more agents of the second facility or automatically without manual intervention.

26. The system of claim 15, further comprising:

a plurality of operator devices configured to communicate with the inventory management server and operated by a corresponding plurality of operators, wherein a first operator device of the plurality of operator devices is configured to:

receive navigation details of the first route from the processing circuitry, and render a user interface to display the navigation details for guiding a first operator, operating the first operator device, to traverse along the first route with the first transport unit for fulfilling the first and second nodes.

27. The system of claim 26, wherein the first operator device is further configured to:

transmit a real-time location of the first operator when the first operator is traversing along the first route for fulfilling the first and second nodes.

28. The system of claim 27, wherein the processing circuitry is further configured to:

receive the real-time location of the first operator from the first operator device, and track a movement of the first operator along the first route in real-time based on the received real-time location.

29. The method of claim 1, further comprising:

receiving, by the inventory management server from an intermediate server located at the second facility, order fulfillment information of the first request that is used to optimize a second request to fulfill a second plurality of inventory items.

* * * * *